(12) United States Patent
Kittaka et al.

(10) Patent No.: US 6,825,963 B2
(45) Date of Patent: Nov. 30, 2004

(54) OPTICAL ELEMENT

(75) Inventors: Shigeo Kittaka, Osaka (JP); Kazuaki Oya, Osaka (JP); Masatoshi Nara, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 13 days.

(21) Appl. No.: 10/347,266

(22) Filed: Jan. 21, 2003

(65) Prior Publication Data

US 2003/0142385 A1 Jul. 31, 2003

(30) Foreign Application Priority Data

Jan. 22, 2002 (JP) ..................................... P2002-012334

(51) Int. Cl.[7] ............................. G02F 1/00; G02F 1/01; G02B 26/02; G02B 6/42; G02B 6/34
(52) U.S. Cl. ....................... 359/237; 359/279; 359/321; 359/586; 359/587; 359/588; 385/31; 385/37; 385/129
(58) Field of Search ................................. 359/279, 321, 359/586, 587, 588, 248, 331, 238; 385/5, 10, 14, 31, 37, 122; 257/451; 372/45

(56) References Cited

U.S. PATENT DOCUMENTS

| | | | |
|---|---|---|---|
| 6,521,136 B1 * | 2/2003 | Sfez et al. | ..................... 216/24 |
| 6,591,035 B2 * | 7/2003 | Miller et al. | ................... 385/24 |
| 2002/0027655 A1 | 3/2002 | Kittaka et al. | |
| 2002/0090173 A1 | 7/2002 | Kittaka et al. | |
| 2002/0122613 A1 | 9/2002 | Kittaka et al. | |
| 2002/0140929 A1 | 10/2002 | Kittaka et al. | |
| 2002/0197042 A1 | 12/2002 | Kittaka et al. | |
| 2002/0035621 A1 | 2/2003 | Kittaka et al. | |
| 2002/0076598 A1 | 4/2003 | Kittaka et al. | |
| 2002/0157211 A1 | 8/2003 | Kittaka et al. | |

OTHER PUBLICATIONS

Article titled "Optics of Floquet–Bloch Waves In Dielectric Gratings" by P. St. J. Russell, 1986 pp. 231–246.
Article titled "Spatial walk–off polarizer utilizing artificial anisotropic dielectrics" by K. Shiraishi and S. Kawakami, vol. 15, No. 9 May 1, 1990 pp. 516–518.
Magazine articled from Technical Digest titled "Superprism phenomena in one dimensional photonic crystals" by Dmitry N. Chigrin.
Article from the Princeton Press titled "Molding the Flow of Light" by John D. Joannopoulos; Robert D. Meade and Joshua N. Winn.
Articled titled "Superprism phenomena in photonic crystals" by Hideo Kosaka: Takayuki Kawashima: Akihisa Tornita: Masaya Notomi; Toshiaki Tamamura; Takashi Sato and Shojiro Kawakami vol. 58. No. 16 dated, Oct. 15, 1998.
Article titled "Photonic band structure of two–dimensional systems: The triangular lattice" by M. Plihal and A.A. Maradudin vol. 44 No. 16 dated, Oct. 15, 1991.
K. Sakoda, "Optical Properties of Photonic Crystals" Springer 2001.
Document of the Optical Society of Japan, the 27th Winter meeting held January.
Micro–Optics Handbook, p. 224, 1995.

* cited by examiner

*Primary Examiner*—Hung Xuan Dang
*Assistant Examiner*—Tuyen Tra
(74) *Attorney, Agent, or Firm*—Whitham, Curtis & Christofferson, P.C.

(57) ABSTRACT

In the invention, light incident onto an end surface of one-dimensional photonic crystal is phase-modulated in the same period and direction as those of the photonic crystal to thereby propagate only specific high-order band light in the photonic crystal. That is, a phase modulation unit for generating phase-modulated wave having the same period as that of the periodic structure is disposed adjacent or close to a light incident surface of the periodic structure.

11 Claims, 24 Drawing Sheets

OPTICAL ELEMENT

BACKGROUND OF THE INVENTION

The present invention relates to an optical element mainly used in an optical communication system, an optical measuring machine or the like. Particularly it relates to an optical element using photonic crystal.

It is known well that photonic crystal having a structure in which dielectrics different in refractive index are arranged periodically at intervals of a period substantially equal to the wavelength of light has the following characteristic properties:

(a) confinement of light due to a photonic band gap;
(b) very large wavelength dispersion due to a unique band structure; and
(c) abnormality in group velocity of propagated light.

A large number of optical elements using such properties have been proposed or examined.

Photonic crystal can be classified into one-dimensional photonic crystal, two-dimensional photonic crystal and three-dimensional photonic crystal by the number of directions having periodic structures. For example, the simplest one-dimensional photonic crystal is a filter formed in such a manner that two kinds of thin films (e.g., $SiO_2$ films and $TiO_2$ films) are laminated alternately on a parallel-plane substrate. The filter has been already put into practical use. This structure has a function of reflecting only input light in a specific wavelength range because it has a photonic band gap in a periodic direction. In addition, because the wavelength range of the photonic band gap for oblique input light varies in accordance with the direction of polarization, the filter can be provided to function as a polarized light separating filter.

A structure formed by application of a photolithography technique in such a manner that air holes are arranged in thin films on a substrate has been examined widely as the two-dimensional photonic crystal. If a linear defect is formed in the arrangement of air holes, the portion of the linear defect can be provided as an optical waveguide.

Because a steric optical waveguide can be achieved if a photonic band gap is achieved in all directions in the three-dimensional photonic crystal, there is expectation that a large number of optical elements will be integrated into an about 1 mm cube.

Of the one-dimensional, two-dimensional and three-dimensional photonic crystals, the one-dimensional photonic crystal has been not investigated so sufficiently as the two-dimensional and three-dimensional photonic crystals because the means of making the best use of the properties of the one-dimensional photonic crystal is almost limited to the aforementioned filter though the one-dimensional photonic crystal has a large merit that the one-dimensional photonic crystal can be produced easily. The properties (b) and (c) of the one-dimensional photonic crystal, however, can be utilized sufficiently though the one-dimensional photonic crystal is inferior in the property (a) to the two-dimensional and three-dimensional photonic crystals. As the means using the properties (b) and (c), there is an example in which an end surface of a multilayer film, that is, a surface having a multilayer structure exposed is used as a light input surface or a light output surface.

For example, theoretical analysis of directions of light rays incident onto a section of an inclined multilayer film has been described in Applied Physics B, Vol.39, p.231, 1986. There has been also disclosed a technique for obtaining the same polarized light separating effect as that of a birefringent material by using the property (so-called structural birefringence) of a multilayer film in which the refractive index of the multilayer film varies widely in accordance with TE/TM polarized light, aiming at separating polarized light by structural birefringence (Optics Letters Vol.15, No.9, p.516, 1990). There has been a further report that very large dispersion (super-prism effect) is obtained because the shape of the first photonic band of a periodic multilayer film is linear in proximity to a band gap ("International Workshop on Photonic and Electromagnetic Crystal Structures" Technical Digest, F1–3).

According to the inventor's examination, it has been further made clear that light substantially perpendicularly incident onto an end surface of a multilayer film is propagated in an aperiodic direction so that the characteristic of photonic crystal can be brought out. According to the inventor's electromagnetic wave simulation and experiment, when plane wave of monochromatic light is made substantially perpendicularly incident onto an end surface of a one-dimensional photonic crystal (periodic multilayer film), the light is separated into waves corresponding to some bands so that the waves are propagated through the multilayer film. When the wavelength of the input light is sufficiently long compared with the period of the multilayer film, only a wave corresponding to the first band (hereinafter referred to as "first band light") is propagated. As the wavelength of the input light becomes shorter, high-order waves such as third band light and fifth band light begin to propagate successively. Accordingly, a part of energy of the input light always propagates as first band light regardless of the wavelength of the input light.

The high-order band light such as third band light or fifth band light has the properties (b) and (c) whereas the first band light does not have the properties (b) and (c). Accordingly, the first band light is wasteful light which is almost useless for an optical element. There is a problem that the first band light serves as stray light causing lowering of an S/N ratio of the element as well as the first band light reduces the efficiency of utilizing input light.

SUMMARY OF THE INVENTION

The invention is provided to solve this problem and an object of the invention is to provide an optical element having a means for propagating only specific high-order band light through photonic crystal.

In the invention, light incident onto an end surface of one-dimensional photonic crystal is phase-modulated in the same period and direction as those of the photonic crystal to thereby propagate only specific high-order band light through the photonic crystal. Or light emergent from an end surface of the photonic crystal is phase-modulated so as to be converted into plane wave.

The action is achieved by the following means.

An optical element according to the invention includes a multilayer structure containing repetition of a periodic structure as at least one repeatable region of a predetermined period, an end surface of the multilayer structure substantially perpendicular to layer surfaces of the multilayer structure being used as a light input surface. The optical element configured as described above further has a phase modulation unit (phase modulation means) disposed adjacent or close to the light input surface for generating phase-modulated wave having the same period as the period of the periodic structure in a laminating direction of the multilayer structure.

Preferably, an end surface of the multilayer structure substantially perpendicular to layer surfaces of the multilayer structure and opposite to the light input surface is used as a light output surface, and the optical element further has a phase modulation unit disposed adjacent or close to the light output surface for substantially converting output light of the multilayer structure into plane wave.

The periodic structure can be regarded as one-dimensional photonic crystal. The phase-modulated wave is generated in such a manner that wave belonging to a single associative photonic band except the lowest-order band is propagated mainly in a direction perpendicular to the periodic direction and not containing the periodic structure.

In the optical element according to the invention, nearly plane wave from the outside of the multilayer structure is converted into phase-modulated wave by the phase modulation unit so that the phase-modulated wave is input into the multilayer structure. The phase modulation unit is constituted either by a phase grating having the same period as that of the periodic structure or by an optical system for making a plurality of plane-wave light rays of the same frequency interfere with one another. Preferably, the phase grating is integrated with the periodic structure. The phase grating can be formed as apart of the multilayer structure separated by a groove formed in proximity to either the light input end surface or the light output end surface of the multilayer structure. The phase modulation unit disposed on the light output side can be formed in the same manner as described above.

The present disclosure relates to the subject matter contained in Japanese patent application No. 2002-12334 (filed on Jan. 22, 2002), which is expressly incorporated herein by reference in its entirety.

DESCRIPTION OF THE PREFERRED EMBODIMENT

Embodiments of the invention will be described below specifically.

Figure 1:
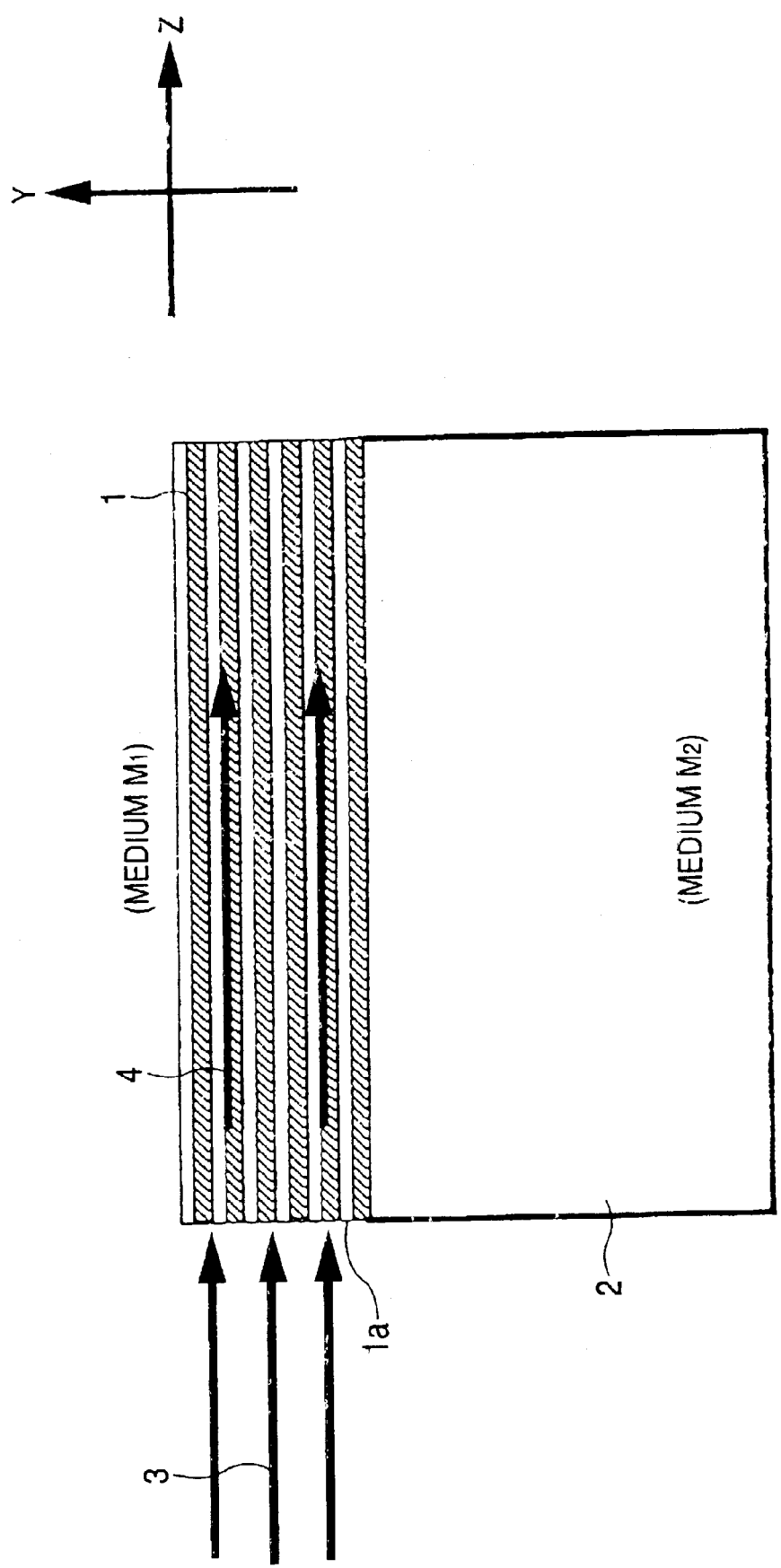
FIG. 1 is a typical view showing propagation of light in a periodic multilayer film.

FIG. 1 is a sectional view typically showing a periodic multilayer film forming a basic structure according to the invention. A periodic multilayer film 1 is formed on a surface of a parallel plane substrate 2 (made of a medium $M_2$). For example, the multilayer film has a structure of period $\underline{a}$ ($=t_A+t_B$) formed so that a substance A with thickness $t_A$ (refractive index $n_A$) and a substance B with thickness $t_B$ (refractive index $n_B$) are laminated alternately. A surface of the multilayer film adjoins a medium $M_1$ (air in the case of FIG. 1).

When luminous flux 3 at wavelength $\lambda_0$ in a vacuum is made incident onto an end surface $1a$ of the periodic multilayer film in FIG. 1, how the light propagates in the multilayer film is analyzed. It is found from the analysis that the periodic myltilayer film functions as so-called photonic crystal to make the propagated light exhibit a unique effect in a predetermined condition.

The characteristic of propagating light in photonic crystal can be known when photonic bands are calculated and mapped out. For example, a method of calculating the bands has been described in detail in "Photonic Crystals", Princeton University Press (1995) or Physical Review B Vol.44, No.16, p.8565, 1991.

Figure 2:
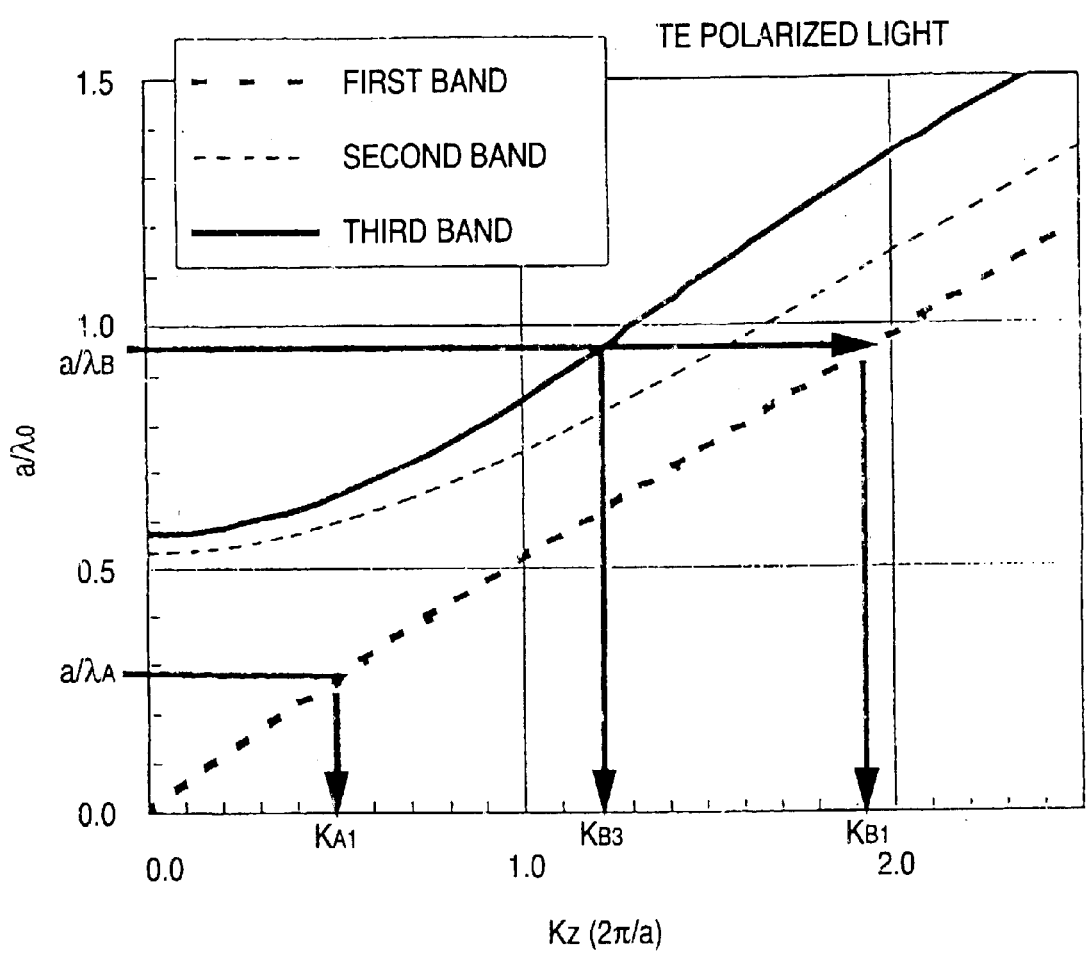
FIG. 2 is a graph showing a photonic band structure (TE polarized light) of the periodic multilayer film.
Figure 3:
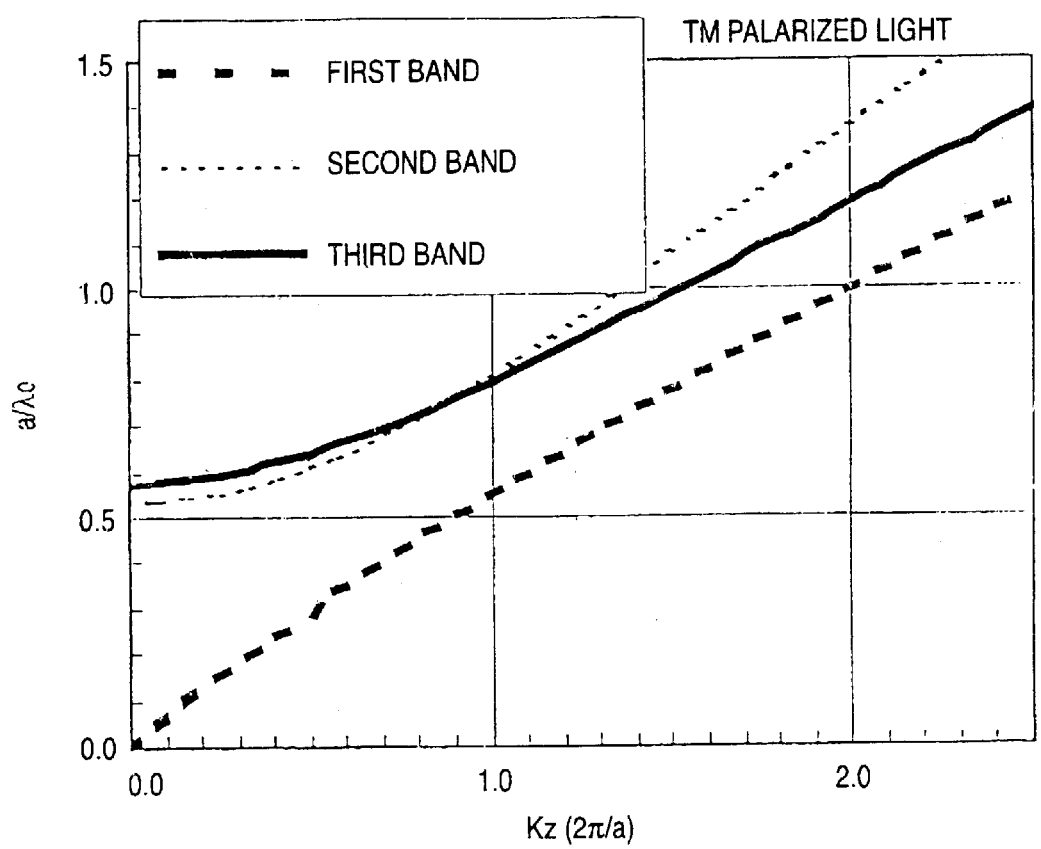
FIG. 3 is a graph showing a photonic band structure (TM polarized light) of the periodic multilayer film.

Assume that the periodic multilayer film shown in FIG. 1 has a periodic structure continued endlessly in a Y direction (laminating direction) and spreads endlessly in X and Z directions (spreading directions of layer surfaces). FIGS. 2 and 3 show first, second and third bands of TE polarized light (FIG. 2) and TM polarized light (FIG. 3) calculated in the Z-axis direction (or the X-axis direction) by a plane wave method in the case where a multilayer structure of period $\underline{a}$ in which layers having the following refractive indices $n_A$ and $n_B$ are laminated alternately.

$n_A$=1.44 ($t_A$=0.5a)

$n_B$=2.18 ($t_B$=0.5a)

Here, the term "TE polarized light" means polarized light in the case where the direction of electric field is the X-axis direction whereas the term "TM polarized light" means polarized light in the case where the direction of magnetic field is the X-axis direction.

In each of FIGS. 2 and 3, the horizontal axis shows the magnitude of a wave vector kz in the Z-axis direction, and the vertical axis shows the standardized frequency:

$\omega a/2\pi c$ in which $\omega$ is the angular frequency of the input light, $a$ is the period of the structure, and $c$ is the velocity of light in a vacuum.

The standardized frequency can be also given by $a/\lambda_0$ in which $\lambda_0$ is the wavelength of the input light in a vacuum. The standardized frequency is hereinafter referred to as $a/\lambda_0$. Because there is no periodicity in the Z-axis direction, a Brillouin zone spreads endlessly without any boundary in the horizontal axis in each of FIGS. 2 and 3.

As shown in FIG. 2, a wave vector $k_{A1}$ corresponding to the first band is present in the photonic crystal when the wavelength of the input light in a vacuum is $\lambda_A$. In other words, a wave at the following wavelength (hereinafter referred to as "first band light"):

$\lambda_{A1}=2\pi/k_{A1}$ is propagated through the photonic crystal in the Z-axis direction.

On the other hand, when the wavelength of the input light in a vacuum is $\lambda_B$, there are wave vectors $k_{B1}$ and $k_{B3}$ corresponding to the first and third bands. The second band is ignored because it is "dissociative". Accordingly, the first band light at wavelength $\lambda_{B1}=2\pi/k_{B1}$ and a wave at wavelength $\lambda_{B3}=2\pi/k_{B3}$ (hereinafter referred to as "third band light") are propagated through the photonic crystal in the Z-axis direction. Incidentally, the theory of dissociative bands has been described in detail in the paper: K. Sakoda "Optical Properties of Phonic Crystals" Springer-Verlag (2001).

Here, a numerical value obtained by dividing a wavelength ($\lambda_A$, $\lambda_B$, etc.) in a vacuum by a corresponding wavelength ($\lambda_{A1}$, $\lambda_{B1}$, etc.) in photonic crystal is defined as "effective refractive index". As is to be understood from FIG. 3, the effective refractive index for the first band light is approximately unchanged regardless of the change of $\lambda_0$ because $a/\lambda_0$ (the vertical axis) is nearly proportional to kz (the horizontal axis). The effective refractive index for the third band light, however, varies widely, in accordance with $\lambda_0$, so that the effective refractive index may become lower than 1 as is obvious from FIGS. 2 and 3.

Figure 4:
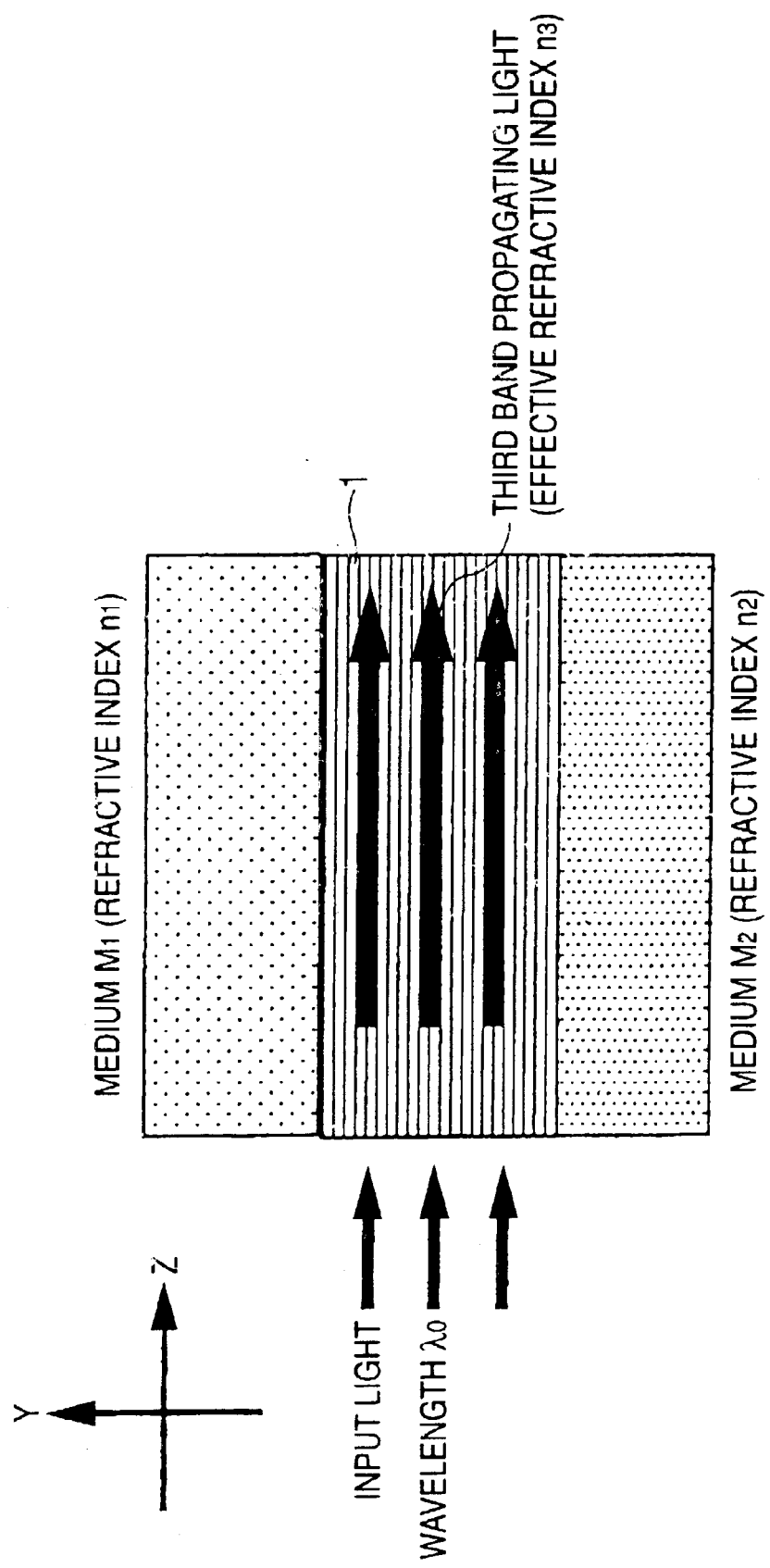
FIG. 4 is a view showing propagation of light in a periodic multilayer film sandwiched between two kinds of homogeneous media.

FIG. 4 shows the third band propagating light (effective refractive index: $n_3$) in the Z-axis direction and media $M_1$ (refractive index: $n_1$) and $M_2$ (refractive index: $n_2$) adjoining opposite surfaces of the periodic multilayer structure in the case where input light at wavelength $\lambda_0$ enters an end surface of the periodic multilayer structure perpendicularly. Assuming now that $n_3$ is higher than $n_1$ and $n_2$, then the third band propagating light can be confined in the inside of the multilayer film by total reflection at interfaces so that the third band propagating light does not go out to the $M_1$ and $M_2$ sides but propagates in the multilayer film.

Although the first band light brings wavelength dispersion to the same degree as in a general homogeneous medium, the third band light exhibits very large wavelength dispersion because the effective refractive index of the third band light varies widely in accordance with the wavelength of the input light as described above. This is a kind of so-called super-prism effect. The super-prism effect has been proposed in Physical Review B, Vol.58, No.16, p.R10096, 1998.

Though not shown in FIGS. 2 and 3, the fourth or higher-order band exhibits large wavelength dispersion. A low-order band such as the second band or the third band is, however, preferably used because the number of "nodes" which will be described later increases in the high-order band. Because it is however impossible to use any "dissociative" band as described above, the preferred band is a "second associative band from the lowest-order band". In FIGS. 2 and 3, the third band is equivalent to the second associative band. In accordance with multilayer structure, the second band may be equivalent to the second associative band.

Because so-called "abnormality of group velocity in photonic crystal" occurs in the third band propagating light, there is expectation that a function of increasing a nonlinear effect will be provided. Because the abnormality of group velocity little occurs in the first band, it is preferable from this respect that the third band is used (see the Optical Society of Japan, the $27^{th}$ Winter Meeting Document pp.41–53, 2001).

Because the periodic multilayer film shown in FIG. 1 has a large difference between the structure in the X-axis direction and the structure in the Y-axis direction, the effective refractive index takes a value varying in accordance with the direction of polarization. This is obvious from the fact that the graph of TE polarized light in FIG. 2 is different from the graph of TM polarized light in FIG. 3. Accordingly, light propagating in the periodic multilayer film has a function of separating polarized light. For example, the periodic multilayer film may be used so that both demultiplexing and separation of polarized light according to wavelengths can be performed simultaneously. Accordingly, functions as provided by a combination of a diffraction grating and a polarized light separating element can be achieved by a single element, so that an optical system can be simplified.

In the case of one-dimensional photonic crystal, however, the difference between TE and TM in a high-order band (second or higher-order band) in a region in which kz is small (in a region close to the vertical axis in FIGS. 2 and 3) is very small, so that polarizing characteristic in this region can be substantially ignored.

As described above, the optical element using the third band propagating light is very useful. As is obvious from FIGS. 2 and 3, the first band light, however, always propagates when the third band light propagates. Because the first band propagating light has little effect of "very large wavelength dispersion" or "abnormality of group velocity" as described above, the first band light is no more than loss when the third band propagating light is used. The first band light serves stray light causing lowering of an S/N ratio of the element as well as the first band light causes great reduction in efficiency of utilizing incident light energy.

According to the inventors' examination, it has been however known that only the third band light can be propagated through the periodic multilayer film when the input light is phase-modulated.

Figure 5:
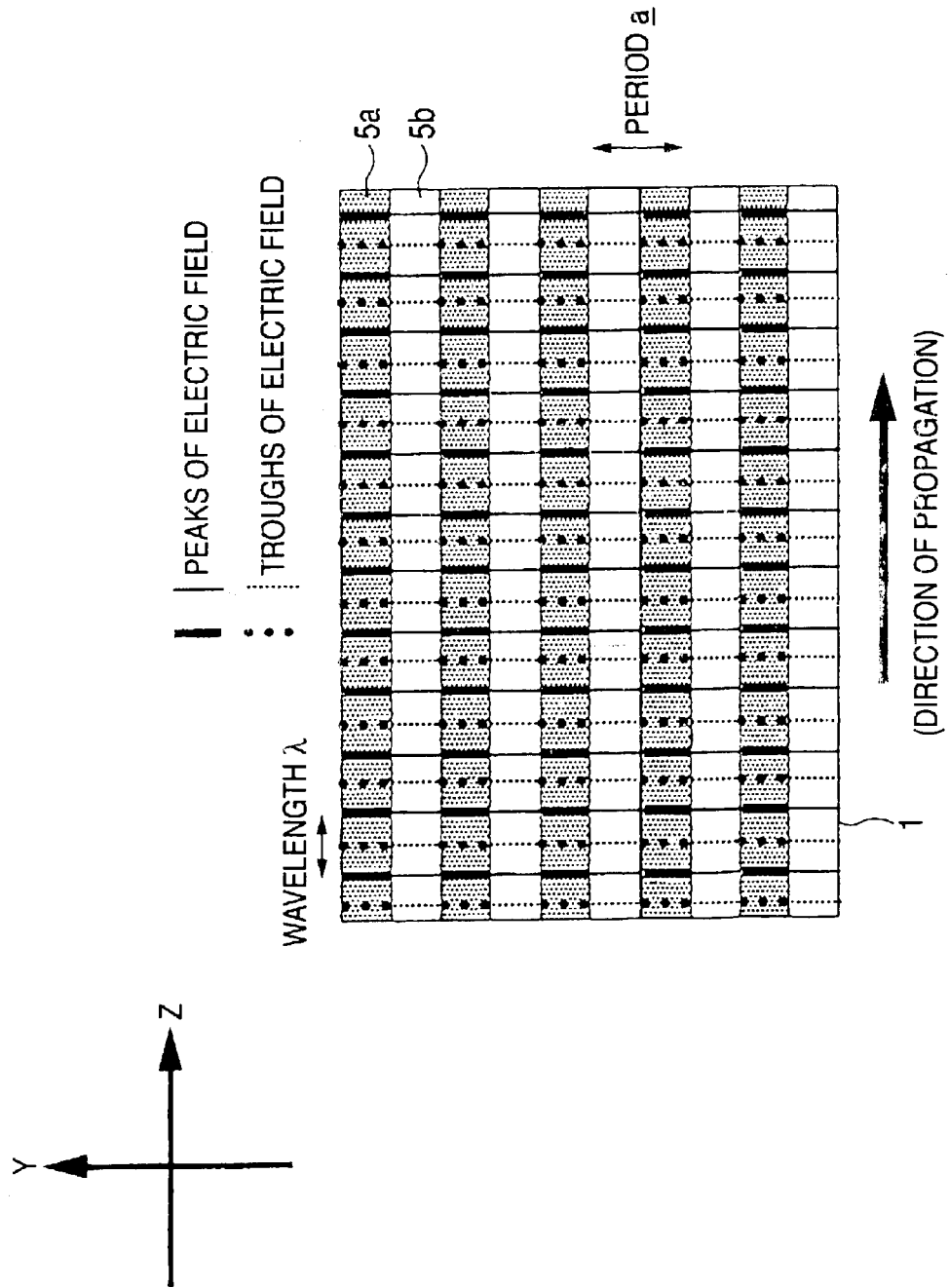
FIG. 5 is a typical view showing an electric field due to first band propagating light.
Figure 6:
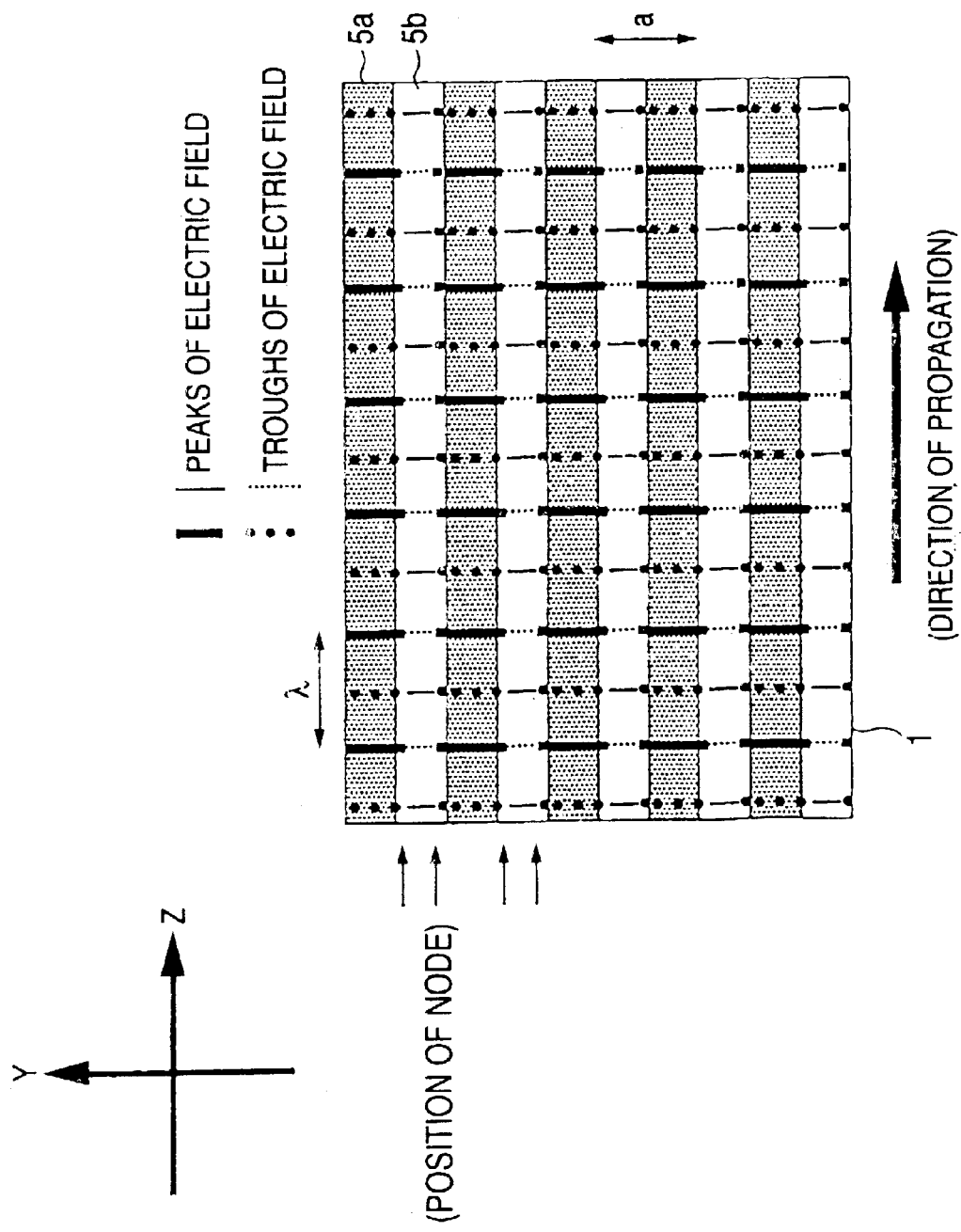
FIG. 6 is a typical view showing an electric field due to third band propagating light.

FIGS. 5 and 6 typically show the intensity of electric field due to the first band propagating light and the third band propagating light in the Z-axis direction in a periodic multilayer film (period $a$) provided as a laminate of alternate substances A and B. In FIGS. 5 and 6, the solid lines show peaks of electric field, the dotted lines show troughs of electric field, and the thickness of each line shows the magnitude of the amplitude.

With respect to the first band propagating light, as shown in FIG. 5, the amplitude of the electric field in the medium A is different from that in the medium B but peaks and troughs of the electric field are formed in respective planes perpendicular to the Z axis. Hence, the first band propagating light propagates as nearly plane wave.

With respect to the third band propagating light, however, as shown in FIG. 6, "nodes" in which the amplitude of the electric field is zero are produced so that one period is divided into two regions. Because adjacent regions differ in the phase of wave by a half wavelength, peaks and troughs appear alternately. Though not shown, in propagating light due to a higher-order band, the number of nodes in one period increases so that the half-wavelength shift occurs frequently in one period.

Figure 14:
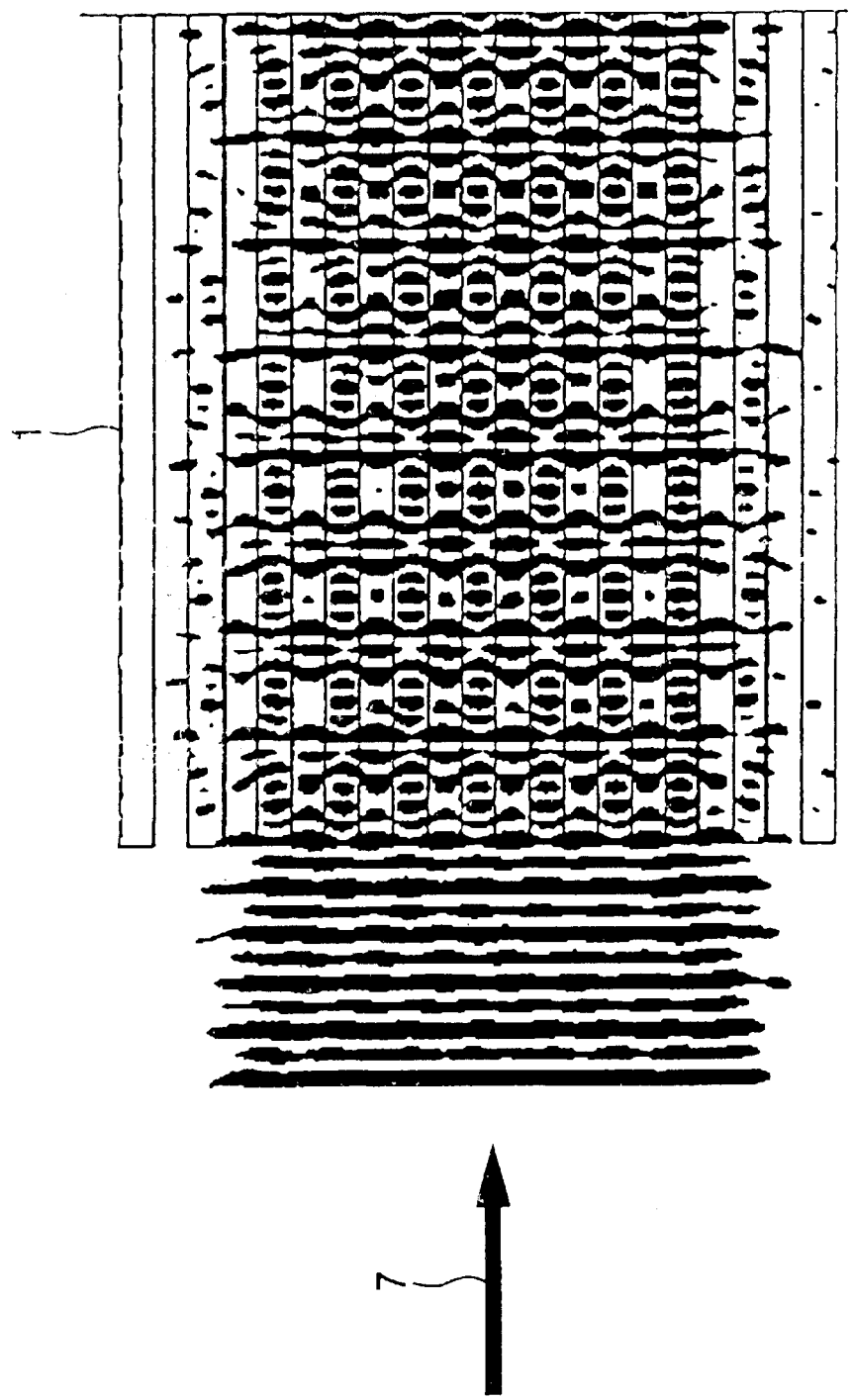
FIG. 14 is a view showing a result of simulation in Comparative Calculation Example 1 for reference.

Accordingly, two kinds of propagating light due to input light at a wavelength (e.g., $\lambda_B$ in FIG. 2) related to both the first and third bands overlap each other, so that a complex electric field pattern as shown in FIG. 14 is exhibited.

Figure 7:
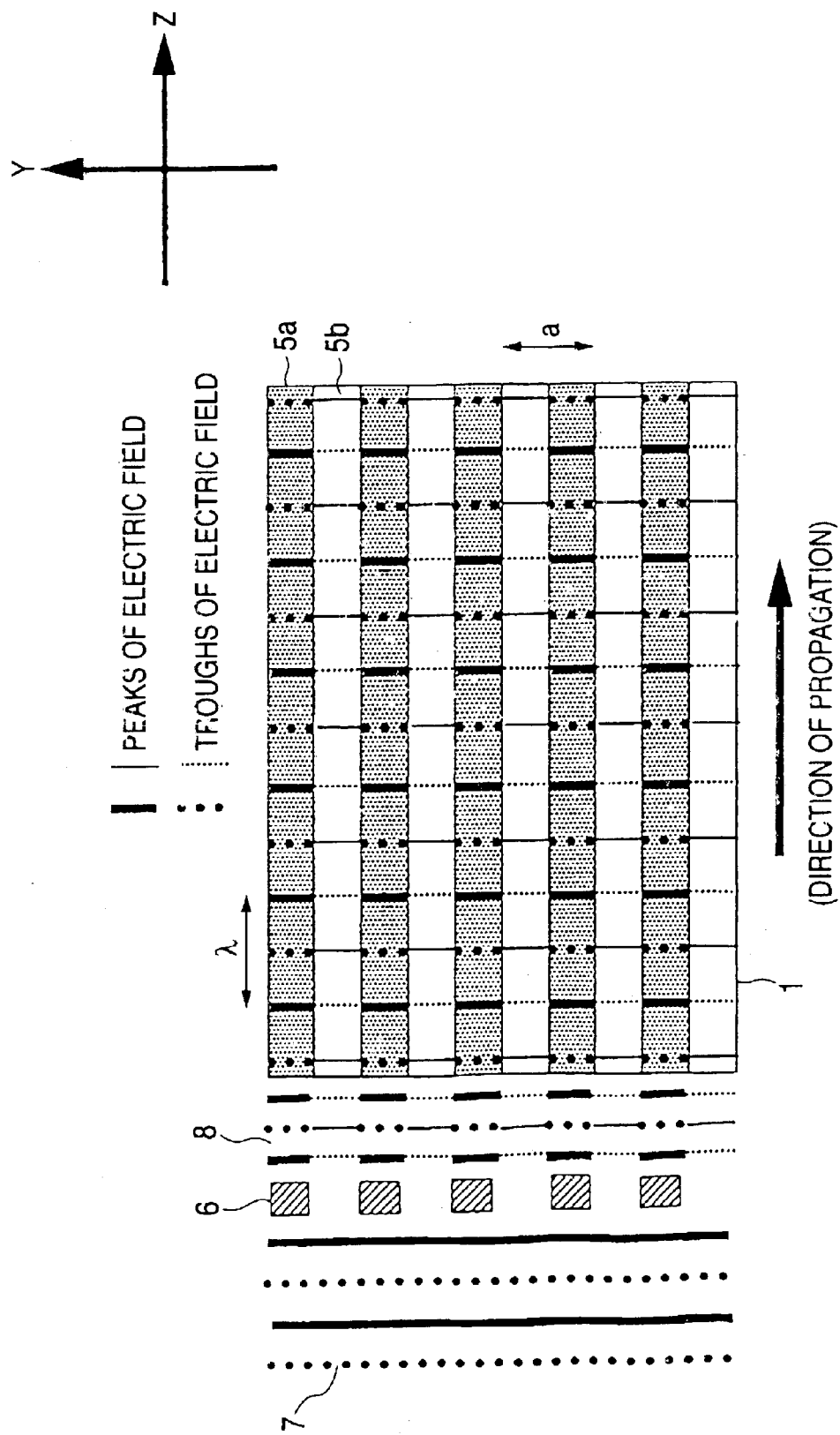
FIG. 7 is a typical view showing light propagating in a periodic multilayer film in the case where a phase grating is provided.
Figure 8:
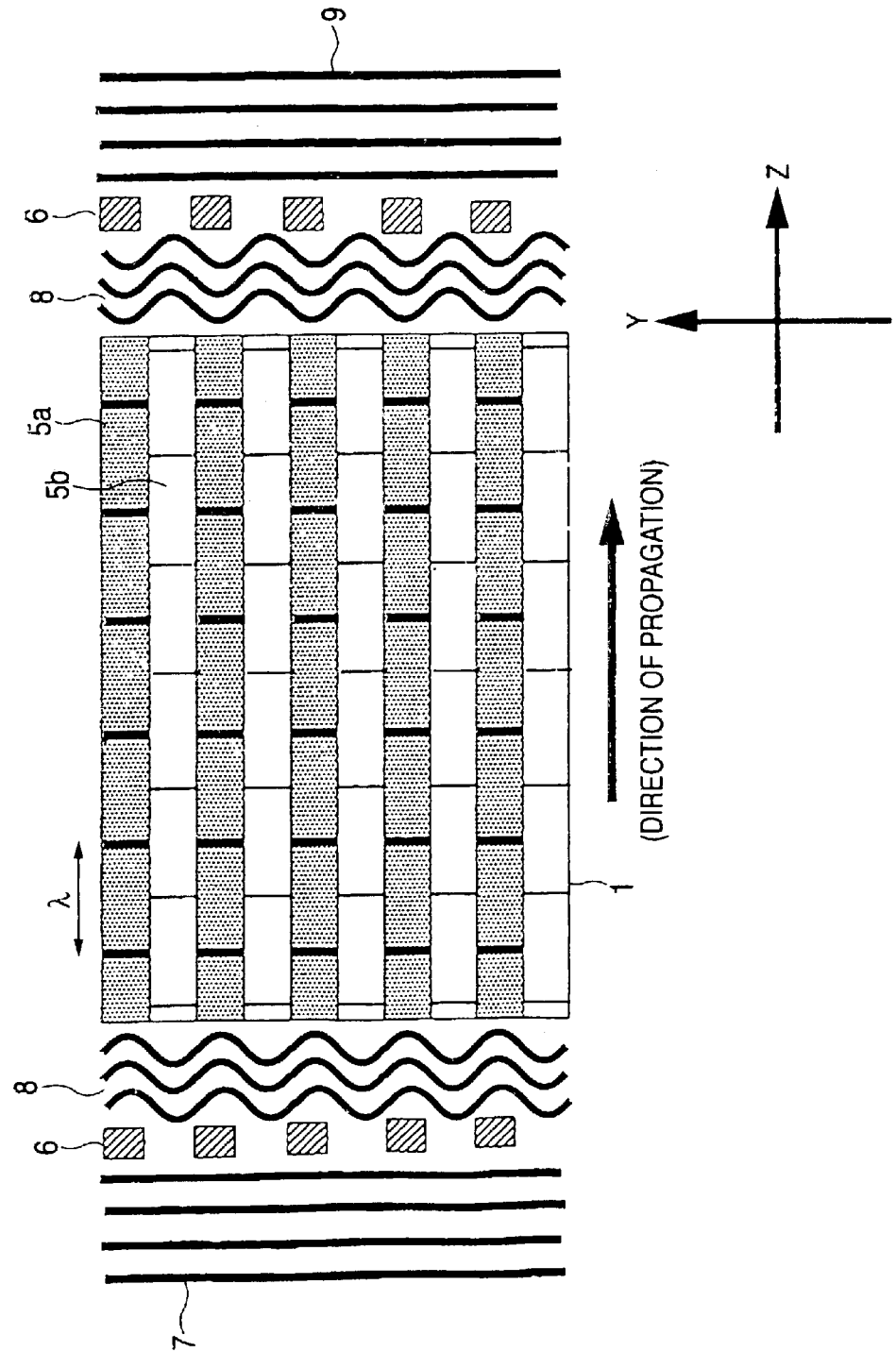
FIG. 8 is a typical view showing light propagating in a periodic multilayer film in the case where phase gratings are provided both on the input side and the output side respectively.

Incidentally, when plane wave 7 is made to enter a phase grating 6 as a phase modulation unit for generating a difference of a half wavelength in a period $a$ in the Y-axis direction as shown in FIG. 7, an electric field pattern similar to that of the third band propagating light in FIG. 6 can be produced in a space 8. It has become clear from the inventors' simulation that only the third band propagating light can be generated without generation of the first band propagating light when an end surface of a periodic multilayer film is disposed in this space 8. The fact that "only propagating light belonging to a specific high-order band can be obtained when appropriate phase-modulated wave having a period $a$ in the periodic direction of a multilayer film having a period $a$ is made to enter the multilayer film" can be generalized from this result. It is also obvious that if it is conceived that the optical path is reversed, the third band propagating light can be restored to plane wave after the third band propagating light is output from an end surface of the multilayer film when an appropriate phase modulation unit is provided on the end surface side (see FIG. 8).

The condition of the phase modulation unit will be described below specifically.

Figure 9:
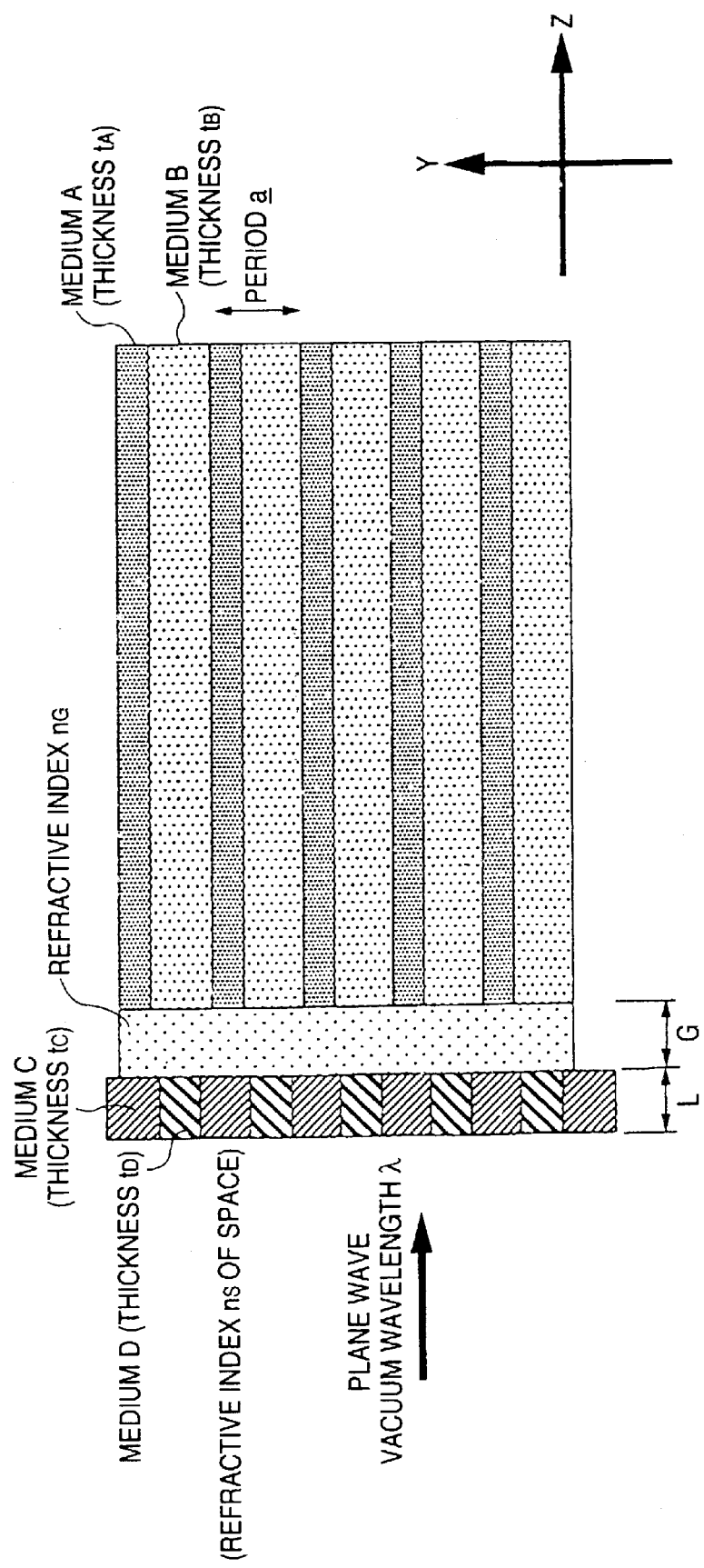
FIG. 9 is a typical view of a phase grating disposed on the input side.

The simplest phase modulation unit is a phase grating having the same period as that of the periodic multilayer film. For example, the phase grating may be disposed as shown in FIG. 9. According to the inventors' simulation, it is necessary to optimize characteristic of phase modulation (such as values of thicknesses $t_C$, $t_D$, L, G, etc. in FIG. 9) in accordance with the characteristic of the periodic multilayer film, i.e., thickness ratio of layers, refractive indices of layers, etc. (see calculation examples which will be described later). Because phase modulation needs to be synchronized with the period of the multilayer film, it is necessary to satisfy the following conditions:

(1) $t_A + t_B = t_C + t_D$;
(2) the Y-direction center of the medium A being coincident with the Y-direction center of the medium C; and
(3) the Y-direction center of the medium B being coincident with the Y-direction center of the medium D.

Because the gap between the phase grating and the periodic multilayer film also has an influence on propagating light, the gap must be selected to be in an optimum range. If the period $a$ of the multilayer film is not larger than the wavelength $\lambda_0$ of light in a vacuum, diffracted light of the order of ±1 by the phase grating cannot propagate when the gap between the phase grating and the periodic multilayer film is provided as an air layer. As a result, the amount of reflected light increases. To prevent increase in the amount of reflected light, there may be used a method of filling the gap with a medium having a high refractive index. Specifically, it is preferable to satisfy the relation:

$$\lambda_0/n_G < a$$

in which $n_G$ is the refractive index of the medium with which the gap is filled.

In practical use of the invention, there may be conceived a method in which a groove is formed in proximity to an end surface of the periodic multilayer film so that a part of the multilayer film can be used as the phase grating as it is. In this case, both the thickness of the phase grating and the width of the groove must be adjusted so that only the third band light can propagate. It is a matter of course that the groove may be provided as an air layer or may be filled with a homogeneous medium.

Figure 10:
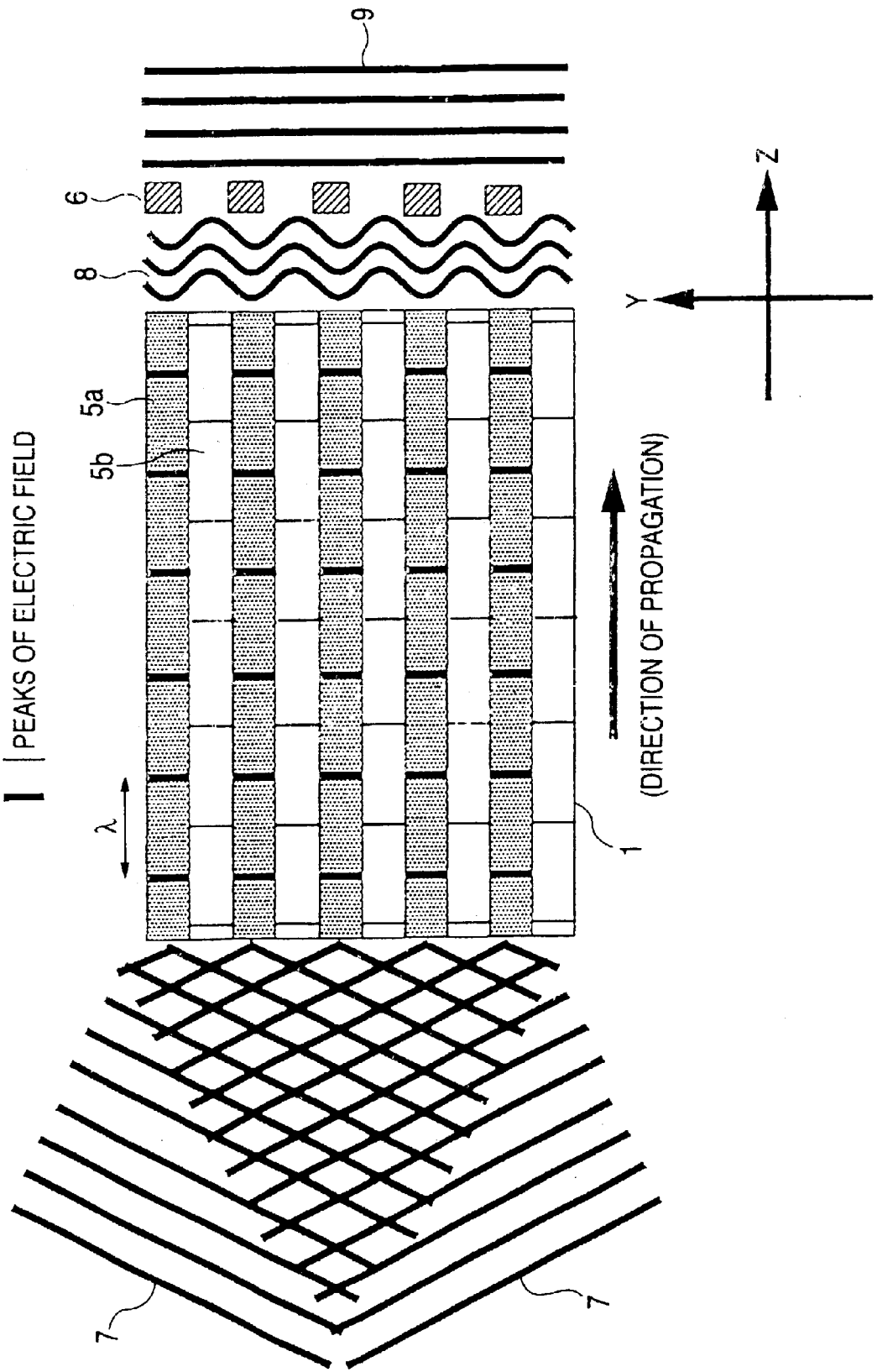
FIG. 10 is a typical view showing light propagating in a periodic multilayer film in the case where interference wave constituted by two plane waves is used as input light.

A method using interference of a plurality of wave surfaces may be also used for generating phase-modulated wave. When two plane waves coherent to each other are made to cross each other as shown in FIG. 10, stationary wave is generated by interference. Hence, the portion of the stationary wave can be provided as phase-modulated wave. The Y-direction period of the phase-modulated wave can be adjusted by the crossing angle of the two plane waves.

Figure 11:
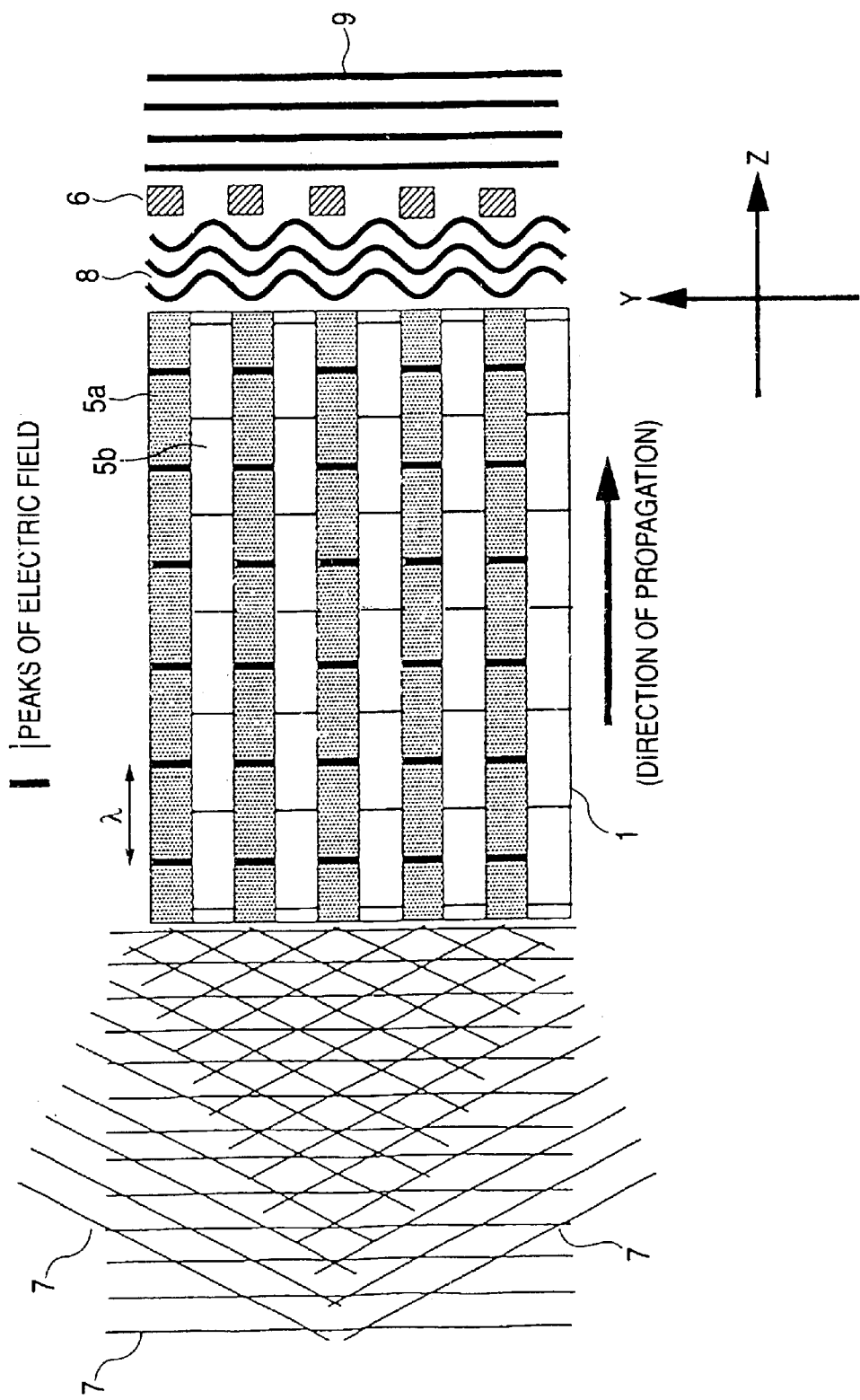
FIG. 11 is a typical view showing light propagating in a periodic multilayer film in the case where interference wave constituted by three plane waves is used as input light.

When a third plane wave is added to the two plane waves as shown in FIG. 11, the phase-modulated wave can be adjusted finely so as to match the multilayer film. Because it is however difficult to adjust three plane waves actually, it is obvious that use of interference of two plane waves is easy and simple as shown in FIG. 10. Accordingly, the structure of the periodic multilayer film is preferably adjusted so that interference wave due to two plane waves can match the third band propagating condition of the multilayer film.

The periodic structure portion of the multilayer structure according to the invention is not limited to the configuration of two kinds of substances as shown in FIG. 1. Three or more kinds of substances may be used. It is however necessary that the refractive index and thickness of each layer have a predetermined period. The periodic structure portion is generally constituted by a laminate of $\underline{m}$ kinds of substances (in which $\underline{m}$ is a natural number). Assume that substances 1, 2, ..., $\underline{m}$ form one period, $n_1$, $n_2$, ..., $n_m$, are refractive indices of the substances 1, 2, ..., $\underline{m}$ respectively and $t_1$, $t_2$, ..., $t_m$ are thicknesses of the substances 1, 2, ..., $\underline{m}$ respectively. The average refractive index nM per period of the multilayer structure with respect to the used wavelength $\lambda$ is defined by the expression:

$$n_M = (t_1 \cdot n_1 + t \cdot n_2 + \ldots + t_m \cdot n_m)/a$$

in which $\underline{a}$ is a period represented by the expression:

$$a = t_1 + t_2 + \ldots + t_m$$

There is no band but the first band (see FIGS. 2 and 3) if the average refractive index $n_M$ of the periodic structure portion roughly satisfies the relation:

$$a/\lambda_0 \leq 0.5/n_M$$

In order to use the second or higher-order band, it is therefore necessary that the period $\underline{a}$ of the multilayer structure and the used wavelength $\lambda_0$ satisfy the relation:

$$\lambda_0/2n_M \leq a$$

If the period $\underline{a}$ is smaller than the conditional range, the characteristic of the multilayer structure becomes close to that of a homogeneous medium having the average refractive index because no light but the first band light can propagate.

The materials of the multilayer film used in the invention are not particularly limited if transparency in the used wavelength range can be ensured. The preferred materials are silica, silicon, titanium oxide, tantalum oxide, niobium oxide, magnesium fluoride, etc. Generally used as materials of a multilayer film and excellent in durability and film-forming cost. These materials can be used for forming the multilayer film easily by a well-known method such as sputtering, vacuum vapor deposition, ion-assist vapor deposition, or plasma CVD.

Because wavelength dispersion or the like has a tendency to increase as the refractive index ratio of the multilayer film materials becomes higher, it is preferable that a high-refractive-index material and a low-refractive-index material are used in combination for an application requiring such characteristic. When, for example, air (refractive index n=1) and InSb (refractive index n=4.21) are used as the low-refractive-index material and the high-refractive-index material respectively, a refractive index ratio of not lower than 4 can be achieved in practice (see "Micro-Optics Handbook" p.224, 1995, ASAKURA SHOTEN).

Because characteristic difference due to the direction of polarization has a tendency to decrease as the refractive index ratio of the multilayer film materials becomes lower, a combination low in the refractive index ratio is also useful for achieving independence of polarization. The modulating function is however weakened so that the expected function may not be fulfilled when the refractive index ratio is too low. Thus, it is preferable that a refractive index ratio of not lower than 1.2 is ensured.

The groove provided in proximity to an end surface of the multilayer film can be produced by the following general method after the multilayer film is laminated.
Application of a Resist Layer→patterning→etching→removal of the resist layer Air or vacuum in the groove portion may be used as the low-refractive-index material or the groove portion may be filled with a medium. As the material of the medium for filling, there can be used an organic resin, a sol-state glass material, or a molten semiconductor material. The sol-state glass material may be gelated and then heated so as to be provided as transparent glass.

If materials are selected appropriately, the function of the invention can be fulfilled in a wavelength range of from about 200 nm to about 20 μm used generally.

The simplest structure of the multilayer film is a structure in which two layers physically equal in thickness to each other are provided in one period. The average refractive index and the band structure-can be adjusted by means of: (1) changing the thickness ratio of the two layers; (2) using three or more layers; or (3) using three or more kinds of film materials to be useful for improvement in dispersion characteristic, polarization characteristic, incident light-utilizing efficiency, etc.

Even in the case where the refractive index of each of layers constituting the multilayer film changes continuously, the characteristic is almost unchanged if the refractive index difference can be ensured.

The material of the substrate for the multilayer film is not particularly limited if the refractive index of the material is in a range free from leakage of propagating light. Examples of the material preferably used are soda lime glass, optical glass, silica, silicon, and compound semiconductor such as gallium arsenide. If limitation due to temperature characteristic or the like is little, a plastic material may be used as the substrate material.

A so-called air bridge structure constituted by only the multilayer film without use of any substrate may be used.

Propagation in the inside of one-dimensional photonic crystal combined with a phase grating is simulated by a finite element method and a result of the simulation will be described below. A software program used is JMAG made by The Japan Research Institute Limited.

The calculation model used is shown in FIG. 9. The one-dimensional photonic crystal has a structure in which homogeneous media A and B are laminated alternately at intervals of a period $\underline{a}$. The layers of the medium A have a total thickness of $t_A \cdot a$. The layers of the medium B have a total thickness of $t_B \cdot a$. The refractive indices of the media A and B are $n_A$ and $n_B$ respectively. The phase grating is disposed so as to be far by a gap G from a vertical section of the photonic crystal. The gap between the photonic crystal and the phase grating is filled with a homogeneous medium having a refractive index $n_G$.

The period of the phase grating constituted by media C and D is the same as that of the photonic crystal. The layers of the medium C have a total thickness of $t_C \cdot a$. The layers of the medium D have a total thickness of $t_D \cdot a$. The refractive indices of the media C and D are $n_C$ and $n_D$ respectively. The phase grating has a length L in the Z-axis direction.

A space having a refractive index $n_S$ is provided in the left of the phase grating. A plane wave (linearly polarized wave) at wavelength $\lambda_0$ in the vacuum is made to enter the phase grating from this space perpendicularly.

Figure 12:
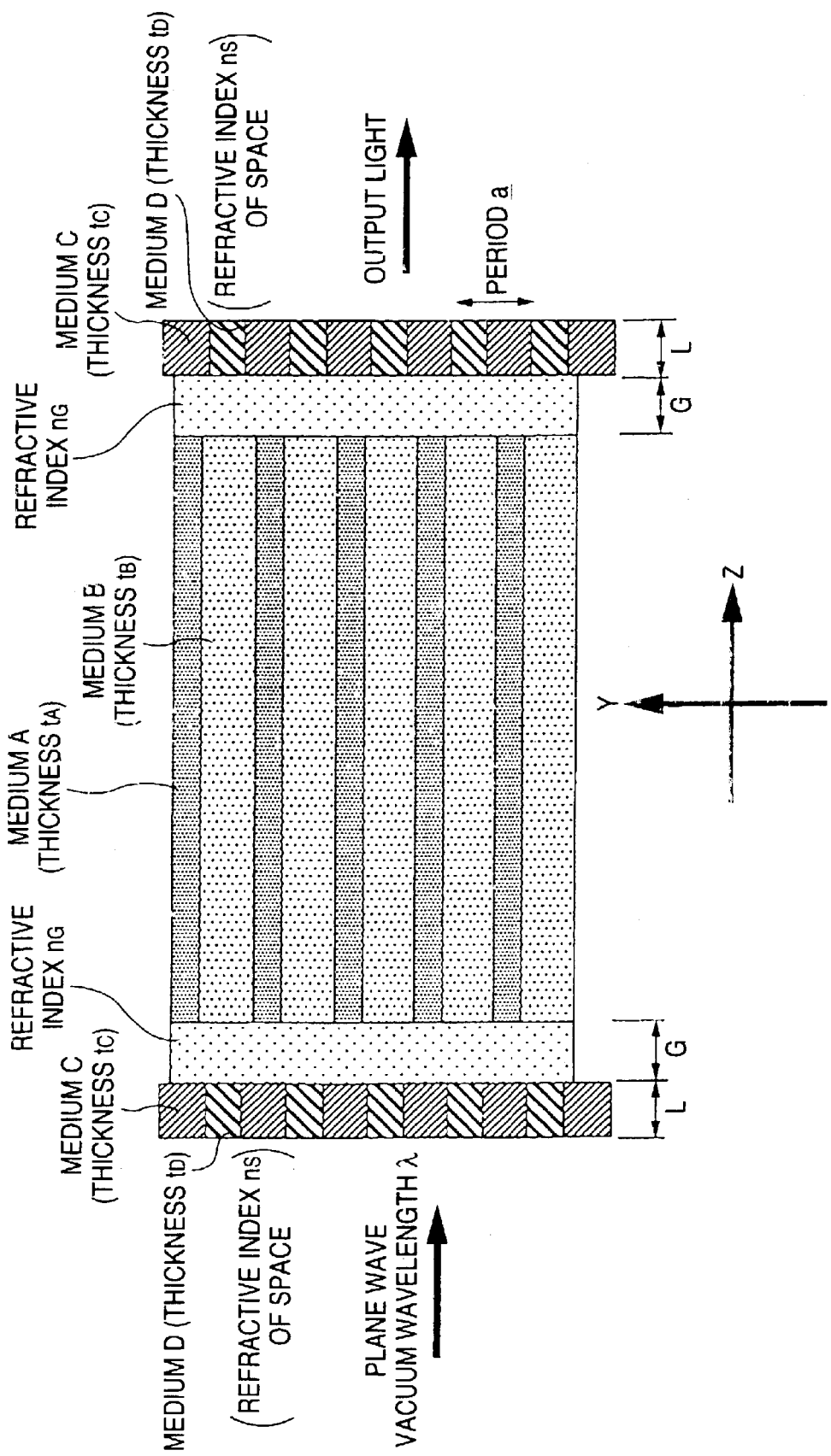
FIG. 12 is a typical view of phase gratings disposed both on the input side and on the output side respectively.

Incidentally, the calculation model shown in FIG. 12 is used when a phase grating the same as in FIG. 9 is also provided on the output side.

CALCULATION EXAMPLE 1

The structure shown in FIG. 9 was subjected to an electromagnetic wave simulation in the following condition. In the following calculation examples and comparative examples, all lengths were standardized with reference to the period $\underline{a}$.

(Period) $\underline{a}$
(Medium A) thickness $t_A$=0.50a, refractive index $n_A$=1.44
(Medium B) thickness $t_B$=0.50a, refractive index $n_B$=1.00
(Medium C) thickness $t_C$=0.50a, refractive index $n_C$=1.44
(Medium D) thickness $t_D$=0.50a, refractive index $n_D$=1.00
(Length of Phase Grating) L=0.803a
(Gap) G=1.00a, $n_G$=1.00
(Space) $n_G$=1.00
(Wavelength in Vacuum) $\lambda_0$=0.7072a, TE polarized light
  (the direction of electric field was the X-axis direction)

Incidentally, calculation was performed in a finite range. The thickness of each of the multilayer film 1 and the phase grating 6 was set to be equal to 11 periods. The width of input light 7 was set to be equal to 8 periods.

Figure 13:
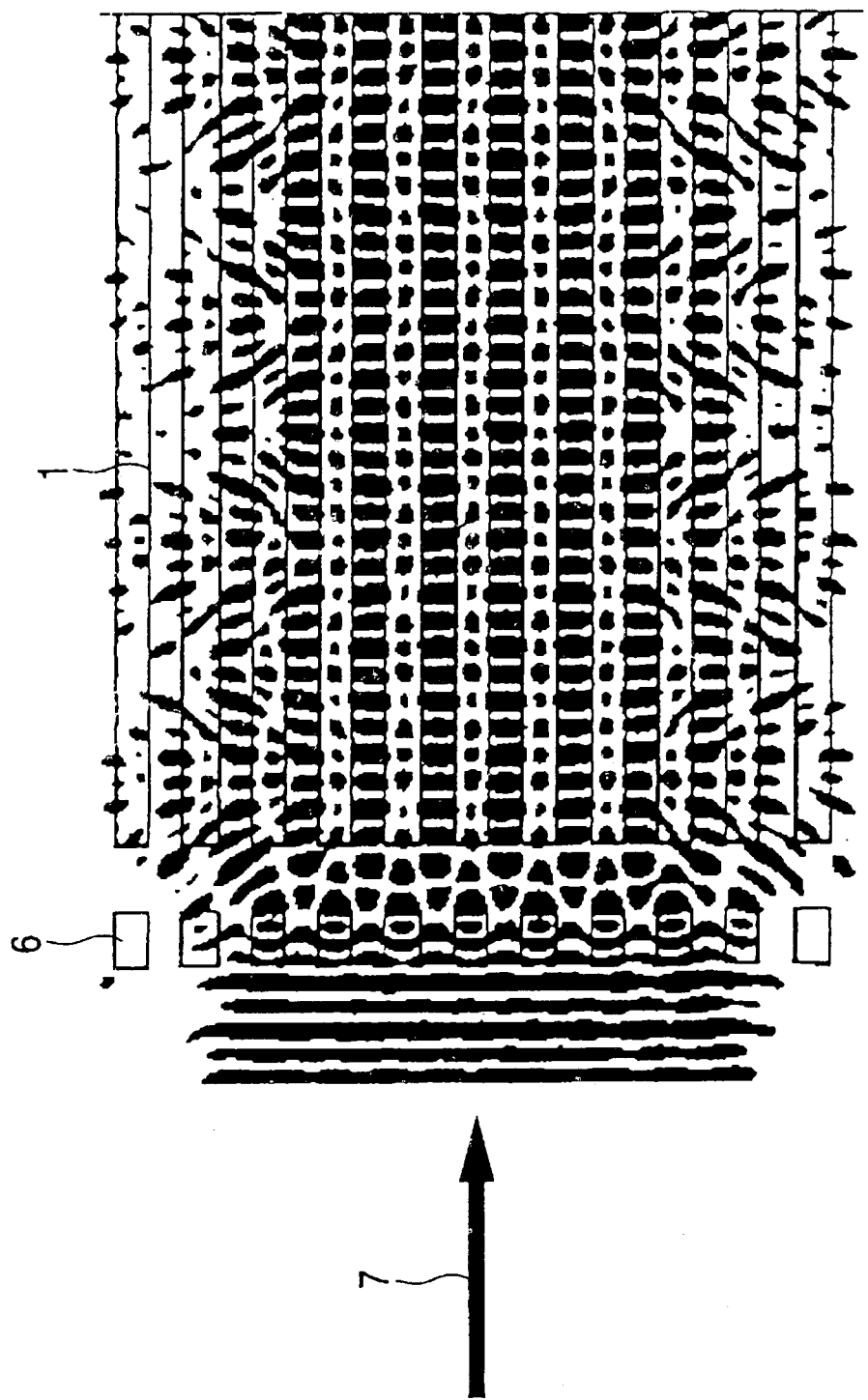
FIG. 13 is a view showing a result of simulation in Calculation Example 1.

As a result of the simulation, an electric field intensity distribution is shown in FIG. 13. The electric field indicates propagation of a nodular wave (the third band propagating light) except the upper and lower end portions in which periodicity is disordered.

Comparative Calculation Example 1

For the sake of comparison, an electromagnetic wave simulation was carried out in the case where the phase grating was removed from the configuration described in Calculation Example 1.

An electric field intensity distribution is shown in FIG. 14. It is obvious from comparison with FIG. 13 that the first band light of short period also propagates so as to overlap with the third band light.

CALCULATION EXAMPLE 2

A structure spreading infinitely in the Y-axis direction as shown in FIG. 12 was subjected to an electromagnetic wave simulation in the following condition.

(Period) $\underline{a}$
(Medium A) thickness $t_A=0.50a$, refractive index $n_A=1.44$
(Medium B) thickness $t_B=0.50a$, refractive index $n_B=1.00$
(Medium C) thickness $t_C=0.50a$, refractive index $n_C=1.44$
(Medium D) thickness $t_D=0.50a$, refractive index $n_D=1.00$
(Length of Phase Grating) $L=0.803a$
(Gap) $G=1.132a$, $n_G=1.00$
(Space) $n_S=1.00$
(Wavelength in Vacuum) $\lambda_0=0.7072a$, TE polarized light (the direction of electric field was the X-axis direction)

A phase grating 6 the same as the phase grating on the input side was disposed in reverse order on the output side of the multilayer film 1.

Figure 15:
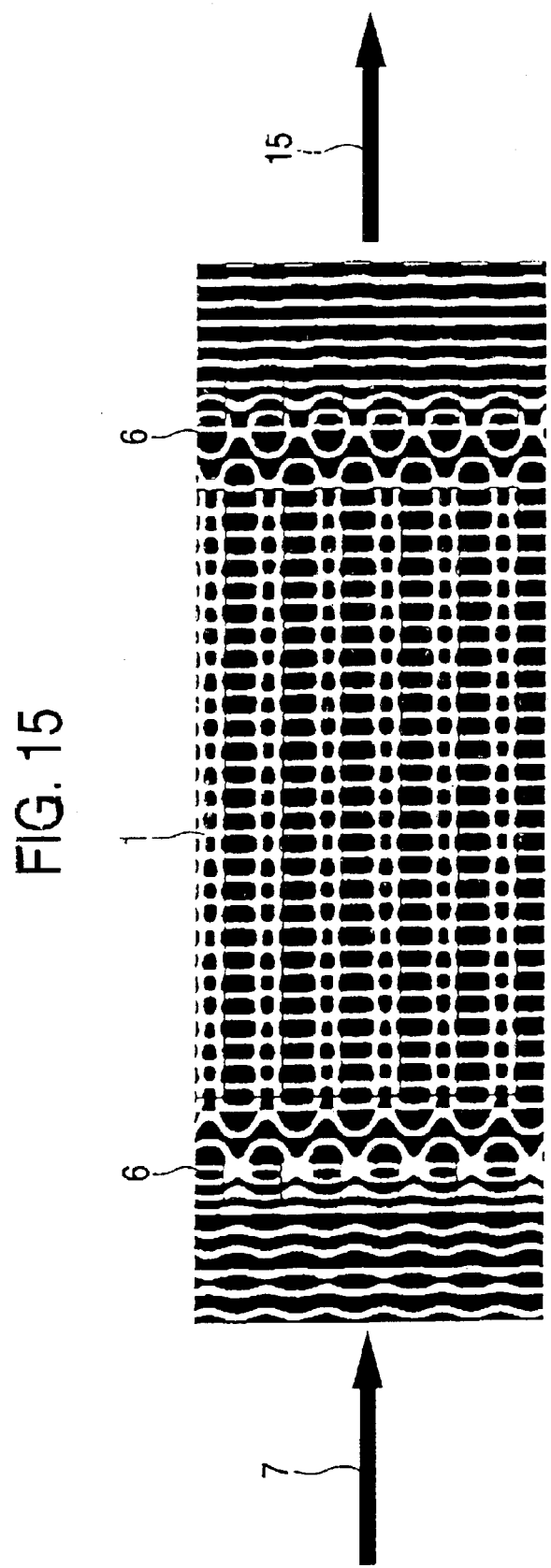
FIG. 15 is a view showing a result of simulation in Calculation Example 2.

As a result of the simulation, an electric field intensity distribution is shown in FIG. 15. It is obvious that the electric field due to light propagating in the multilayer film 1 indicates a nodular wave (the third band propagating light), and that the wave is converted into plane wave 15 again by the phase grating on the output side.

CALCULATION EXAMPLE 3

The structure spreading infinitely in the Y-axis direction as shown in FIG. 12 was subjected to an electromagnetic wave simulation in the following condition.

(Period) $\underline{a}$
(Medium A) thickness $t_A=0.60a$, refractive index $n_A=3.48$
(Medium B) thickness $t_B=0.40a$, refractive index $n_B=1.44$
(Medium C) thickness $t_C=0.60a$, refractive index $n_C=3.48$
(Medium D) thickness $t_D=0.50a$, refractive index $n_D=1.44$
(Length of Phase Grating) $L=16.44a$
(Gap) $G=100a$, $n_G=2.00$
(Space) $n_S=1.00$
(Wavelength in Vacuum) $\lambda_0=1.722a$, TE polarized light (the direction of electric field was the X-axis direction)

A phase grating 6 the same as the phase grating on the input side was disposed in reverse order on the output side of the multilayer film 1.

Figure 16:
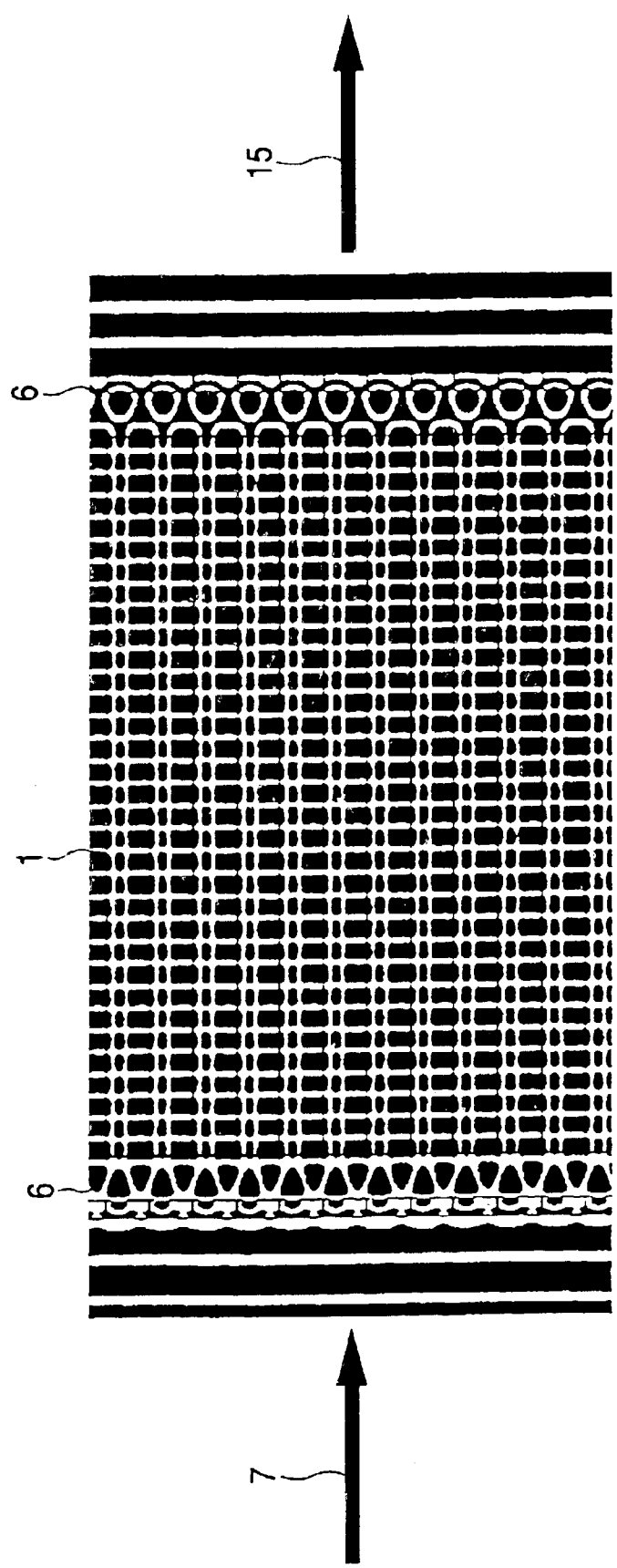
FIG. 16 is a view showing a result of simulation in Calculation Example 3.

An electric field intensity distribution is shown in FIG. 16. It is obvious that the electric field due to light propagating in the multilayer film 1 indicates a nodular wave (the third band propagating light), and that the wave is converted into plane wave 15 again by the phase grating on the output side.

CALCULATION EXAMPLE 4

The structure spreading infinitely in the Y-axis direction as shown in FIG. 9 was subjected to an electromagnetic wave simulation in the following condition.

In this calculation example, the phase grating was not disposed and the input light 16 was phase-modulated in the Y-axis direction. That is, light was input from a free space 20 ($n_S=1.00$) (see FIG. 17) while the phase of the input light was changed like sine wave of period $\underline{a}$ in the Y-axis direction.

(Period) $\underline{a}$
(Medium A) thickness $t_A=0.9a$, refractive index $n_A=1.44$
(Medium B) thickness $t_B=0.1a$, refractive index $n_B=1.00$
(Space) $n_S=1.00$
(Wavelength in Vacuum) $\lambda_0=0.707a$, TE polarized light (the direction of electric field was the X-axis direction)

Figure 17:
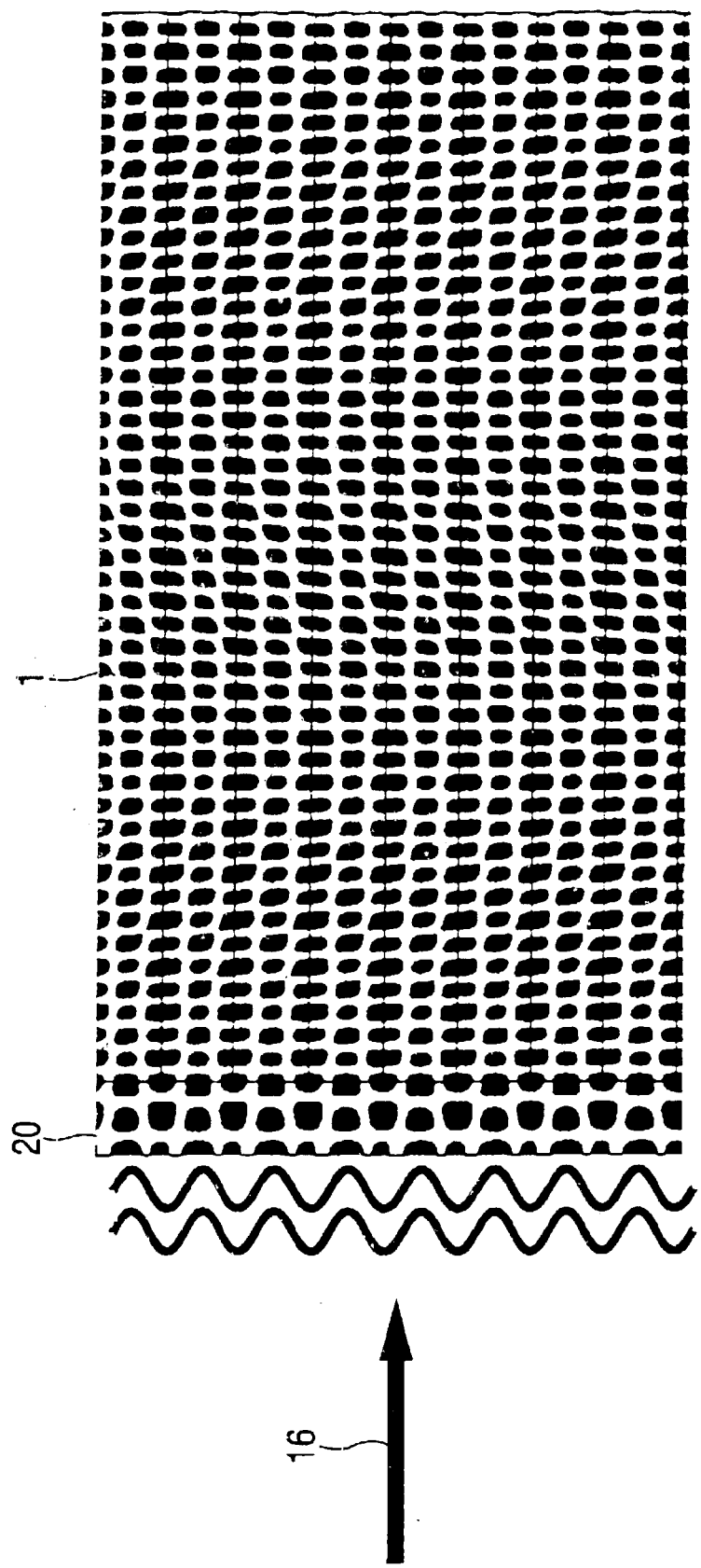
FIG. 17 is a view showing a result of simulation in Calculation Example 4.

An electric field intensity distribution is shown in FIG. 17. The electric field due to light propagating in the multilayer film 1 indicates a nodular wave (the third band propagating light)

Comparative Calculation Example 2

The same input light 16 as in Calculation Example 4 was used and the thickness ratio of the multilayer film 1 was changed as follows.

Figure 18:
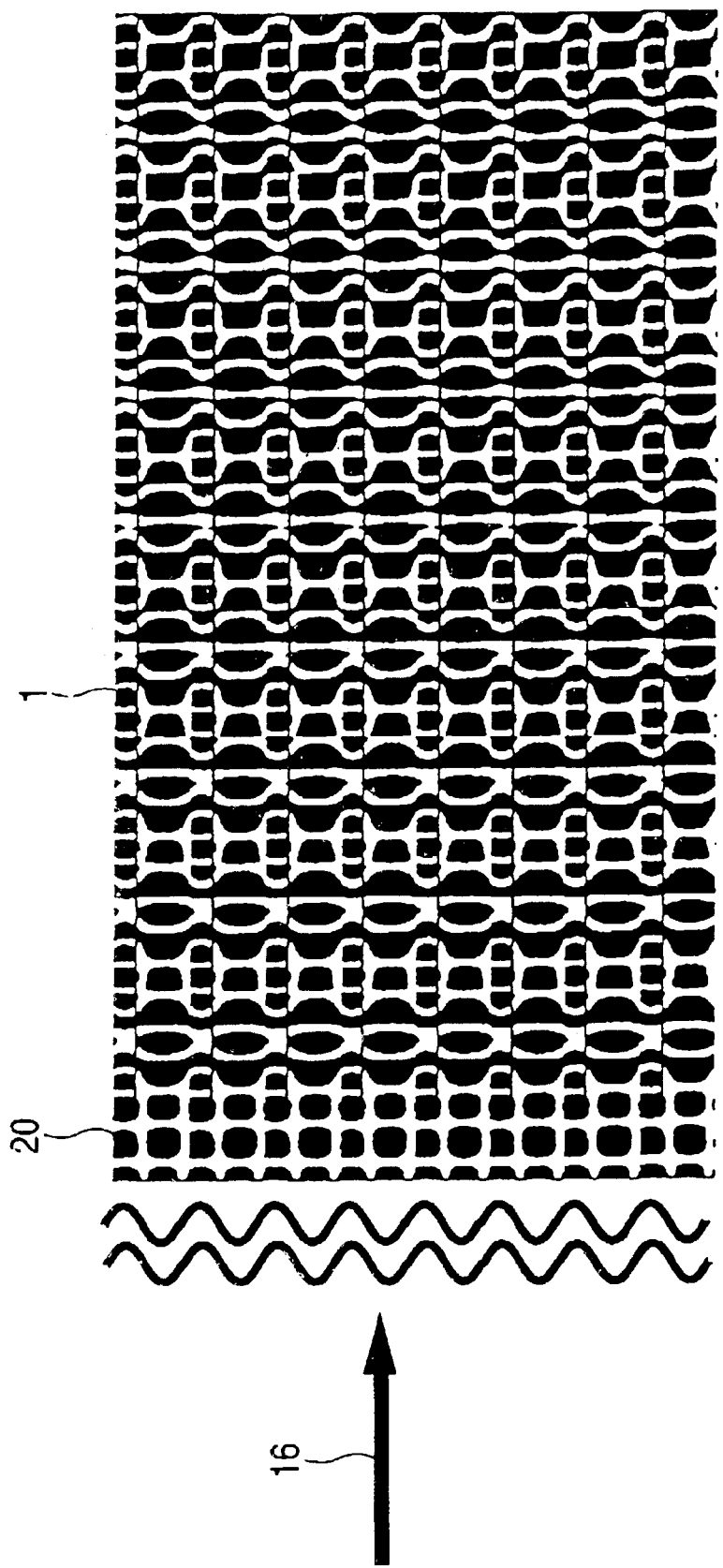
FIG. 18 is a view showing a result of simulation in Comparative Calculation Example 4 for reference.

(Period) $\underline{a}$
(Medium A) thickness $t_A=0.3a$, refractive index $n_A=1.44$
(Medium B) thickness $t_B=0.7a$, refractive index $n_B=1.00$ An electric field intensity distribution is shown in FIG. 18. The electric field due to light propagating in the multilayer film 1 indicates that a wave short in period (the first band light) appears in layers of the medium A. This is the case where matching between characteristic of the multilayer film 1 and phase modulation of the input light 16 is unsuitable.

CALCULATION EXAMPLE 5

The structure spreading finitely in the Y-axis direction as shown in FIG. 12 was subjected to an electromagnetic wave simulation in the following condition.

Figure 19:
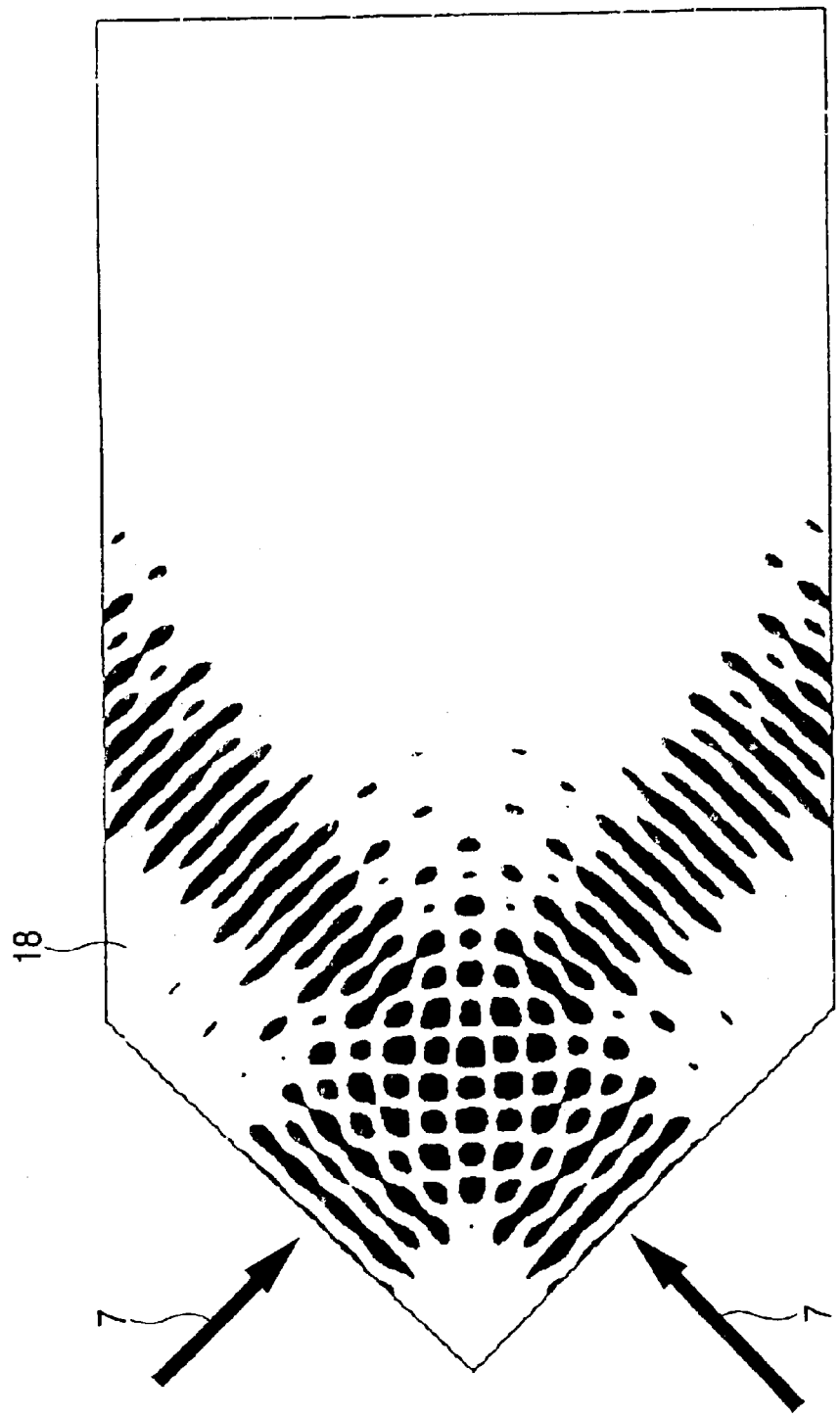
FIG. 19 is a view showing a result of simulation in plane waves crossing each other.

In this calculation example, no phase gratings were disposed both on the input side and on the output side and the input light 7 was provided as plane waves from two directions. As shown in FIG. 19, the same Y-axis direction phase-modulated wave as the input light 16 in Calculation Example 4 was formed in a crossing portion of the plane waves 7 in a free space 18. Therefore, the multilayer film 1 formed in the following condition was disposed in the crossing portion.

(Period) $\underline{a}$
(Medium A) thickness $t_A=0.9a$, refractive index $n_A=1.44$
(Medium B) thickness $t_B=0.1a$, refractive index $n_B=1.00$
(Space) $n_S=1.00$
(Wavelength in Vacuum) $\lambda_0=0.707a$, TE polarized light (the direction of electric field was the X-axis direction), Plane waves inclined at $\pm 45°$ crossed each other.

The multilayer film 1 the same as in Calculation Example 4 was used because it was proved from Calculation Example 4 that matching between the multilayer film 1 and the input light 16 phase-modulated like sine wave was good.

Figure 20:
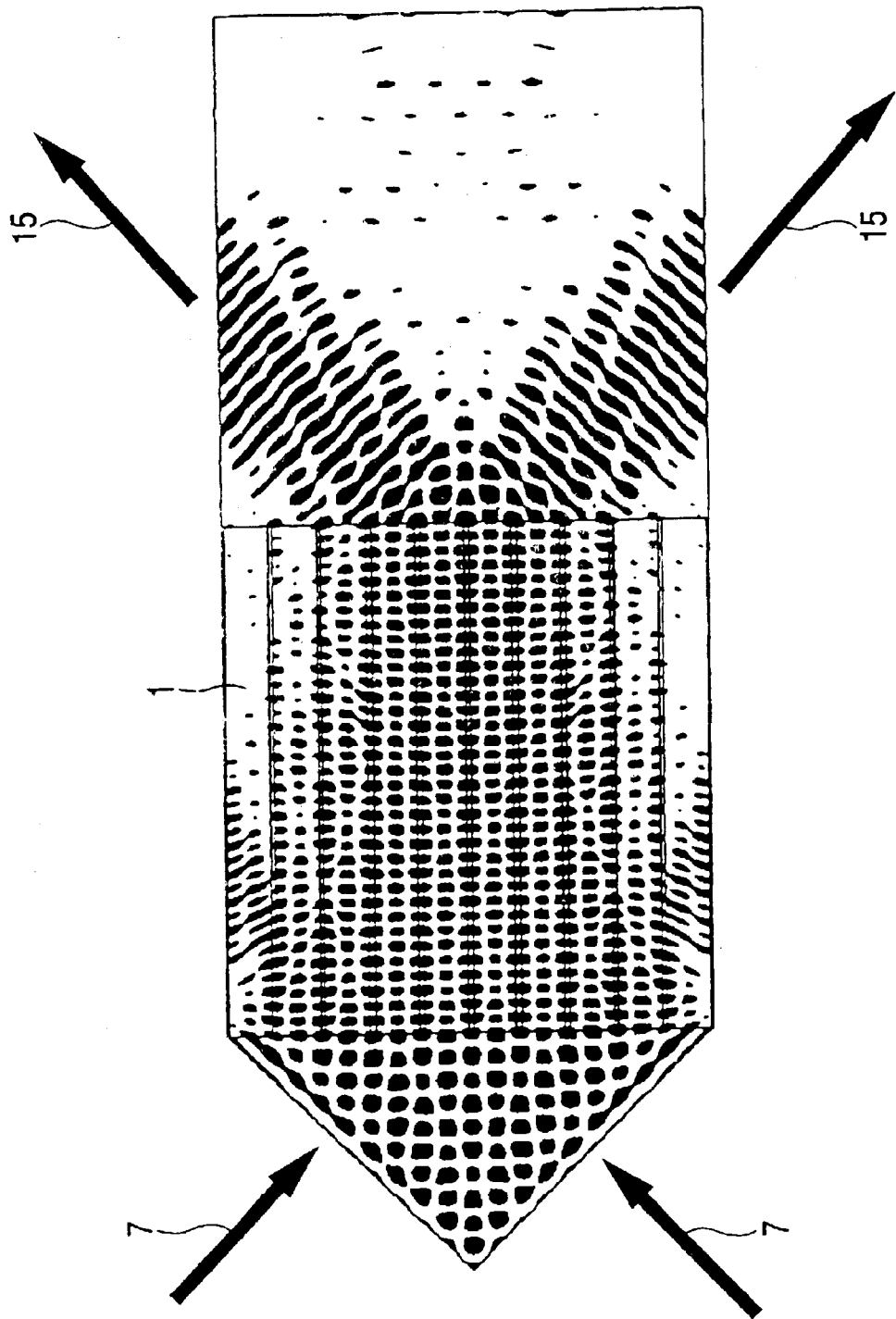
FIG. 20 is a view showing a result of simulation in Calculation Example 5.

An electric field intensity distribution is shown in FIG. 20. Because the input light 7 is narrow, wave disorder occurs in the upper and lower end portions of the multilayer film 1. Light propagating in the central portion of the multilayer film 1 is however provided as a nodular wave (the third band propagating light)

It is also obvious that the output light from the right of the multilayer film 1 is separated into two plane waves like the input light 7.

CALCULATION EXAMPLE 6

The structure spreading infinitely in the Y-axis direction as shown in FIG. 9 was subjected to an electromagnetic wave simulation in the following condition.

In this calculation example, the phase grating was not disposed and the input light 16 was phase-modulated in the Y-axis direction. That is, light was input from the free space 20 ($n_S=1.00$) (see FIG. 21) while the phase of the input light 16 was changed like sine wave of period $\underline{a}$ in the Y-axis direction.

(Period) $\underline{a}$ (Medium A) thickness $t_A=0.9a$, refractive index $n_A=3.48$ (Medium B) thickness $t_B=0.1a$, refractive index $n_B=1.44$ (Space) $n_S=1.00$ (Wavelength in Vacuum) $\lambda_0=1.722a$, TE polarized light (the direction of electric field was the X-axis direction)

Figure 21:
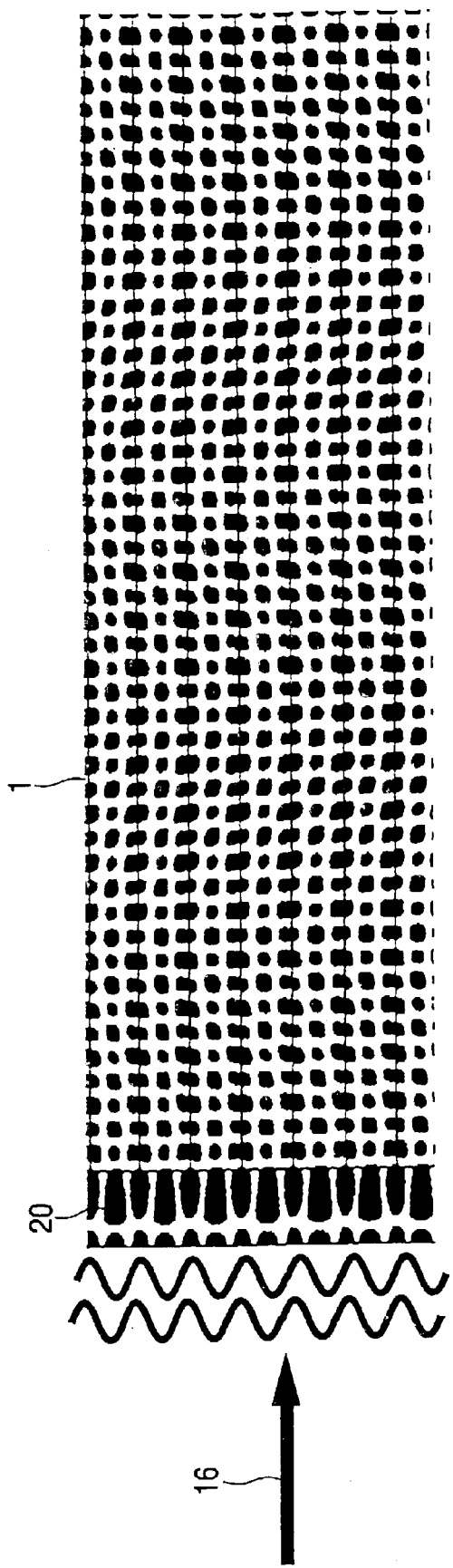
FIG. 21 is a view showing a result of simulation in Calculation Example 6.

An electric field intensity distribution is shown in FIG. 21. The electric field due to light propagating in the multilayer film 1 indicates a nodular wave (the third band propagating light)

Comparative Calculation Example 3

The same input light 16 as in Calculation Example 6 was used and only the thickness ratio of the multilayer film 1 was changed as follows.

Figure 22:
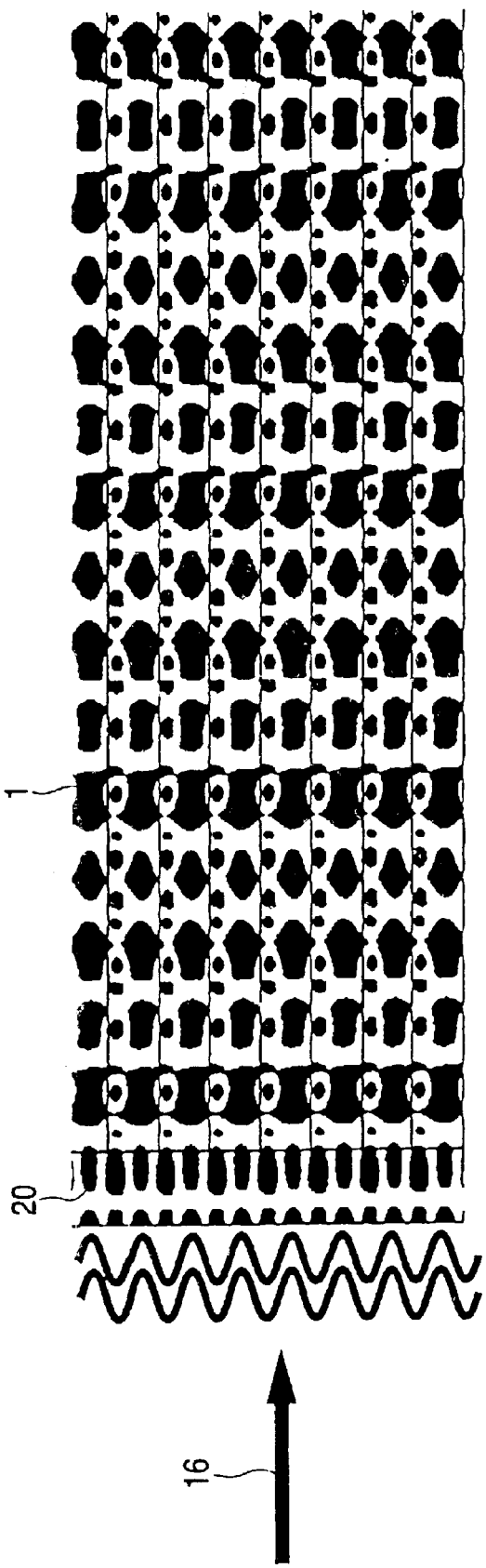
FIG. 22 is a view showing a result of simulation in Comparative Calculation Example 6 for reference.

(Period) $\underline{a}$ (Medium A) thickness $t_A=0.3a$, refractive index $n_A=1.44$ (Medium B) thickness $t_B=0.7a$, refractive index $n_B=1.00$ An electric field intensity distribution is shown in FIG. 22. The electric field due to light propagating in the multilayer film 1 indicates that a wave short in period (the first band light) appears in layers of the medium A. This is the case where matching between characteristic of the multilayer film 1 and phase modulation of the input light 16 is unsuitable.

Applied Example 1
Demultiplexing/Multiplexing Device

Figure 23:
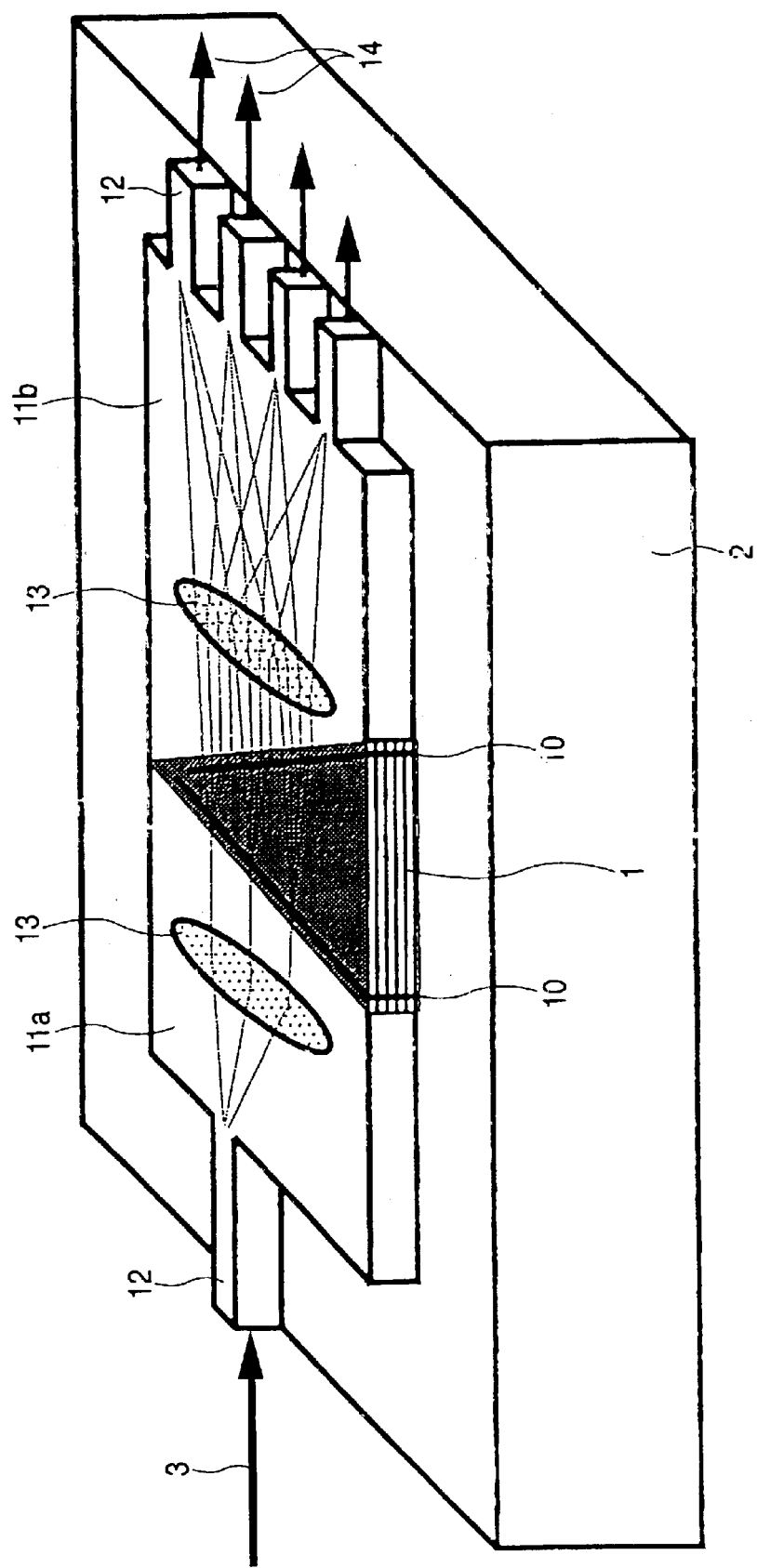
FIG. 23 is a typical view showing a demultilexing/multiplexing device as an applied example of the invention.

FIG. 23 is a typical view of a demultiplexing device as an applied example of the invention. Input light 3 containing a multiple-wavelength optical signal is introduced into a first slab waveguide 11a through a first linear waveguide 12 formed on a substrate 2. In the case shown in FIG. 23, an optical fiber or the like is connected to a start end of the first linear waveguide 12. Alternatively, an optical fiber or the like may be directly connected to an end surface of the first slab waveguide 11a. Because the optical signal spreads planarly in the first slab waveguide 11a, the optical signal is changed to nearly parallel luminous flux by a convex lens portion 13 provided in the first slab waveguide 11a. For example, the convex lens portion 13 can be achieved by replacement of a part of the first slab waveguide 11a by a material having a higher refractive index. Alternatively, a material having a lower refractive index may be used for forming a concave lens portion to obtain the same light-condensing effect as described above or a diffraction lens may be used.

The optical signal enters obliquely a triangular prism-shaped periodic multilayer film 1 in the same planar layer as the first slab waveguide 11a. A groove 10 is provided in proximity to an input side end surface of the periodic multilayer film 1. An outside portion of the groove 10 serves as a phase grating. Because the optical signal enters a body of the periodic multilayer film 1 through the groove after subjected to the modulation function of the phase grating, the optical signal propagates as the third band light in the multilayer film 1. Because the third band light exhibits very large wavelength dispersion, the optical signal passed through the prism-shaped multilayer film 1 is output as nearly parallel luminous flux separated by wavelengths. A groove 10 the same as the groove 10 provided on the input side is provided in an output side end surface of the multilayer film 1. Hence, the third band propagating light is converted into plane wave so that the plane wave enters a second slab waveguide 11b. A convex lens portion 13 is also provided in the second slab waveguide 11b. Hence, the optical signal is converged into optical signals 14 in accordance with the wavelengths, so that the converged optical signals 14 are output from terminals of linear waveguides 12 to optical fibers or the like.

Although FIG. 23 shows an example of the demultiplexing device, the invention can be also applied to a multiplexing device if the input side and the output side are replaced by each other.

Applied Example 2
Dispersion Compensating Device

Figure 24:
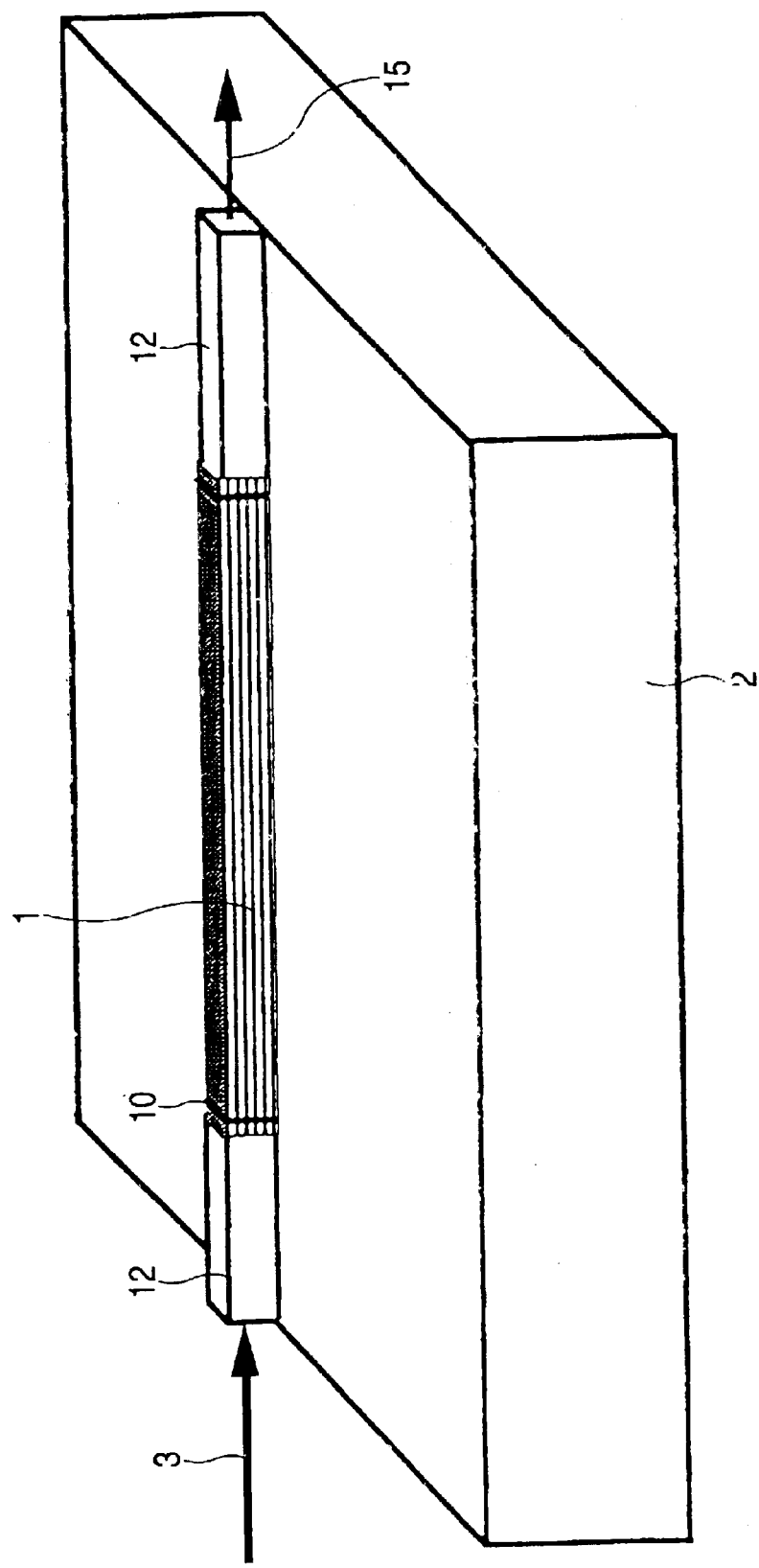
FIG. 24 is a typical view showing a dispersion compensating device as an applied example of the invention.

FIG. 24 is a typical view of a dispersion compensating device as an applied example of the invention.

An optical signal requiring dispersion compensation is introduced from an optical fiber into a waveguide 12 (of a homogeneous material) formed on a substrate 2. The optical signal is delivered to a linear multilayer film waveguide 1 through the waveguide 12. A groove 10 is provided at a start end of the multilayer film waveguide 1. Hence, only the third band light propagates in the multilayer film waveguide 1. Because the group velocity Vg of the third band light varies widely in accordance with the wavelength of the input light as described above, dispersion compensation is performed while the third band light is propagated through the multilayer film waveguide 1 comparatively short in distance.

The dispersion-compensated optical signal is converted into plane wave 15 again by a groove 10 provided at a last end of the multilayer film waveguide 1. The plane wave 15 is connected to an optical fiber or the like through a waveguide 12 of a homogeneous material.

According to this applied example, dispersion compensation which has been performed by a dispersion compensating optical fiber having a length of several km in the related art can be performed by a small-size device having a waveguide structure.

Applied Example 3
Nonlinear Optical Element

As described above, in the inside of the multilayer structure according to the invention, a nonlinear optical effect is increased by propagating light slow in group velocity. Hence, an optical element having a nonlinear optical effect considerably higher than that in the related art can be achieved by the following means:

doping the periodic structure portion with a substance exhibiting a nonlinear optical function and provided as fine particles;

disposing a thin-film layer containing a substance exhibiting a nonlinear optical function in the periodic structure portion at every interval of the period; or providing a substance itself forming the periodic structure portion as a substance exhibiting a nonlinear optical function.

ADVANTAGE OF THE INVENTION

As described above, in accordance with the invention, by using the fact that refracted light from a multilayer structure has good directivity and the direction of the refracted light has strong dependence on wavelength, a high resolution demultiplexing device or polarized light separating device can be achieved without causing increase in size of the device. Because the multilayer structure can be mass-produced relatively inexpensively by an existing technique, reduction in cost of these optical elements can be attained.

What is claimed is:

1. An optical element comprising:
   a multilayer structure containing repetition of a periodic structure as at least one repeatable region of a predetermined period, an end surface of said multilayer structure substantially perpendicular to layer surfaces of said multilayer structure being used as a light input surface; wherein said optical element further comprises:

a phase modulation unit disposed adjacent or close to said light input surface for generating phase-modulated wave having the same period as the period of said periodic structure in a laminating direction of said multilayer structure.

2. An optical element according to claim 1, wherein:

an end surface of said multilayer structure substantially perpendicular to layer surfaces of said multilayer structure and opposite to said light input surface is used as a light output surface; and said optical element further comprises a phase modulation unit disposed adjacent or close to said light output surface for substantially converting output light of said multilayer structure into plane wave.

3. An optical element according to claim 2, wherein said phase modulation unit is a phase grating having the same period as that of said periodic structure.

4. An optical element according to claim 3, wherein said phase grating is integrated with said periodic structure.

5. An optical element according to claim 2, wherein said phase-modulated wave is generated so that wave belonging to a single associative photonic band except the lowest-order band is propagated through the region of said periodic structure regarded as one-dimensional photonic crystal, mainly in a direction perpendicular to the periodic direction and not containing said periodic structure.

6. An optical element according to claim 1, wherein said phase-modulated wave is generated so that wave belonging to a single associative photonic band except the lowest-order band is propagated through the region of said periodic structure regarded as one-dimensional photonic crystal, mainly in a direction perpendicular to the periodic direction and not containing said periodic structure.

7. An optical element according to claim 1, wherein nearly plane wave from the outside of said multilayer structure is converted into said phase-modulated wave by said phase modulation unit so that said phase-modulated wave is input into said multilayer structure.

8. An optical element according to claim 7, wherein said phase modulation unit is a phase grating having the same period as that of said periodic structure.

9. An optical element according to claim 8, wherein said phase grating is integrated with said periodic structure.

10. An optical element according to claim 9, wherein said phase grating is a part of said multilayer structure separated by a groove formed in proximity to one of the light input end surface and the light output end surface of said multilayer structure.

11. An optical element according to claim 7, wherein said phase modulation unit is an optical system for making a plurality of plane-wave light rays of the same frequency interfere with one another.

* * * * *